(12) United States Patent
Sato

(10) Patent No.: US 10,904,500 B2
(45) Date of Patent: Jan. 26, 2021

(54) INFORMATION PROCESSING APPARATUS AND INFORMATION PROCESSING METHOD

(71) Applicant: SONY CORPORATION, Tokyo (JP)

(72) Inventor: Reiichi Sato, Tokyo (JP)

(73) Assignee: Sony Corporation, Tokyo (JP)

(*) Notice: Subject to any disclaimer, the term of this patent is extended or adjusted under 35 U.S.C. 154(b) by 385 days.

(21) Appl. No.: 15/751,266

(22) PCT Filed: May 20, 2016

(86) PCT No.: PCT/JP2016/065030
§ 371 (c)(1),
(2) Date: Feb. 8, 2018

(87) PCT Pub. No.: WO2017/038167
PCT Pub. Date: Mar. 9, 2017

(65) Prior Publication Data
US 2020/0204771 A1    Jun. 25, 2020

(30) Foreign Application Priority Data

Sep. 1, 2015 (JP) .................................. 2015-171760

(51) Int. Cl.
*H04N 9/31* (2006.01)
(52) U.S. Cl.
CPC ........... *H04N 9/3185* (2013.01); *H04N 9/317* (2013.01); *H04N 9/3155* (2013.01)

(58) Field of Classification Search
CPC ...... G03B 21/28; G03B 21/53; G03B 21/142; G03B 21/147; G03B 21/2053;
(Continued)

(56) References Cited

U.S. PATENT DOCUMENTS 7,165,849 B2 *  1/2007  Masuzawa ............... G01C 3/10
                                                     348/E5.137
2006/0285089 A1  12/2006  Higashi
(Continued)

FOREIGN PATENT DOCUMENTS

CN           1880996 A      12/2006
CN         201015022 Y       1/2008
(Continued)

OTHER PUBLICATIONS

International Search Report and Written Opinion of PCT Application No. PCT/JP2016/065030, dated Jul. 19, 2016, 10 pages.

*Primary Examiner* — Sultan Chowdhury
(74) *Attorney, Agent, or Firm* — Chip Law Group

(57) ABSTRACT

An information processing apparatus including a determination unit that acquires a first detection result and a second detection result. The first detection result indicates information regarding at least one of a position and an orientation of a projection unit. The projection unit causes display information to be displayed by projecting the display information onto a projection plane. The second detection result indicates a spatial positional relationship between the projection unit and the projection plane. The information processing apparatus further includes a control unit that controls an operation of the projection unit on a basis of the first detection result and the second detection result.

16 Claims, 19 Drawing Sheets

(58) Field of Classification Search
CPC .... H04N 9/317; H04N 9/3155; H04N 9/3182; H04N 9/3185; H04N 9/3194; H04N 9/3197
See application file for complete search history.

(56) References Cited

U.S. PATENT DOCUMENTS

| | | | |
|---|---|---|---|
| 2009/0207384 A1* | 8/2009 | Honjo | G03B 33/08 353/69 |
| 2011/0304833 A1 | 12/2011 | Osaka et al. | |
| 2011/0306388 A1 | 12/2011 | Osaka et al. | |
| 2013/0194554 A1* | 8/2013 | Aruga | H04N 9/3194 353/69 |
| 2014/0118705 A1* | 5/2014 | Hasegawa | H04N 9/3194 353/85 |
| 2015/0281418 A1 | 10/2015 | Aizawa | |

FOREIGN PATENT DOCUMENTS

| | | |
|---|---|---|
| EP | 1734404 A1 | 12/2006 |
| JP | 2006-349997 A | 12/2006 |
| JP | 2008-185815 A | 8/2008 |
| JP | 1422074 B2 | 2/2010 |
| JP | 4422074 B2 | 2/2010 |
| JP | 2010-226683 A | 10/2010 |
| JP | 2010-226699 A | 10/2010 |
| JP | 2015-184642 A | 10/2015 |
| WO | 2010/098376 A1 | 9/2010 |

\* cited by examiner

FIG. 4

|  |  |  | ACCELERATION | | |
|---|---|---|---|---|---|
|  |  |  | LARGE | MEDIUM | SMALL |
| DISTANCE | MEASURABLE | DISTANCE CHANGE LARGE | OFF | OFF | ON |
|  |  | DISTANCE CHANGE SMALL | OFF | ON (CONTROL FOR ADJUSTMENT) | ON |
|  | UNMEASURABLE | | OFF | OFF | ON |

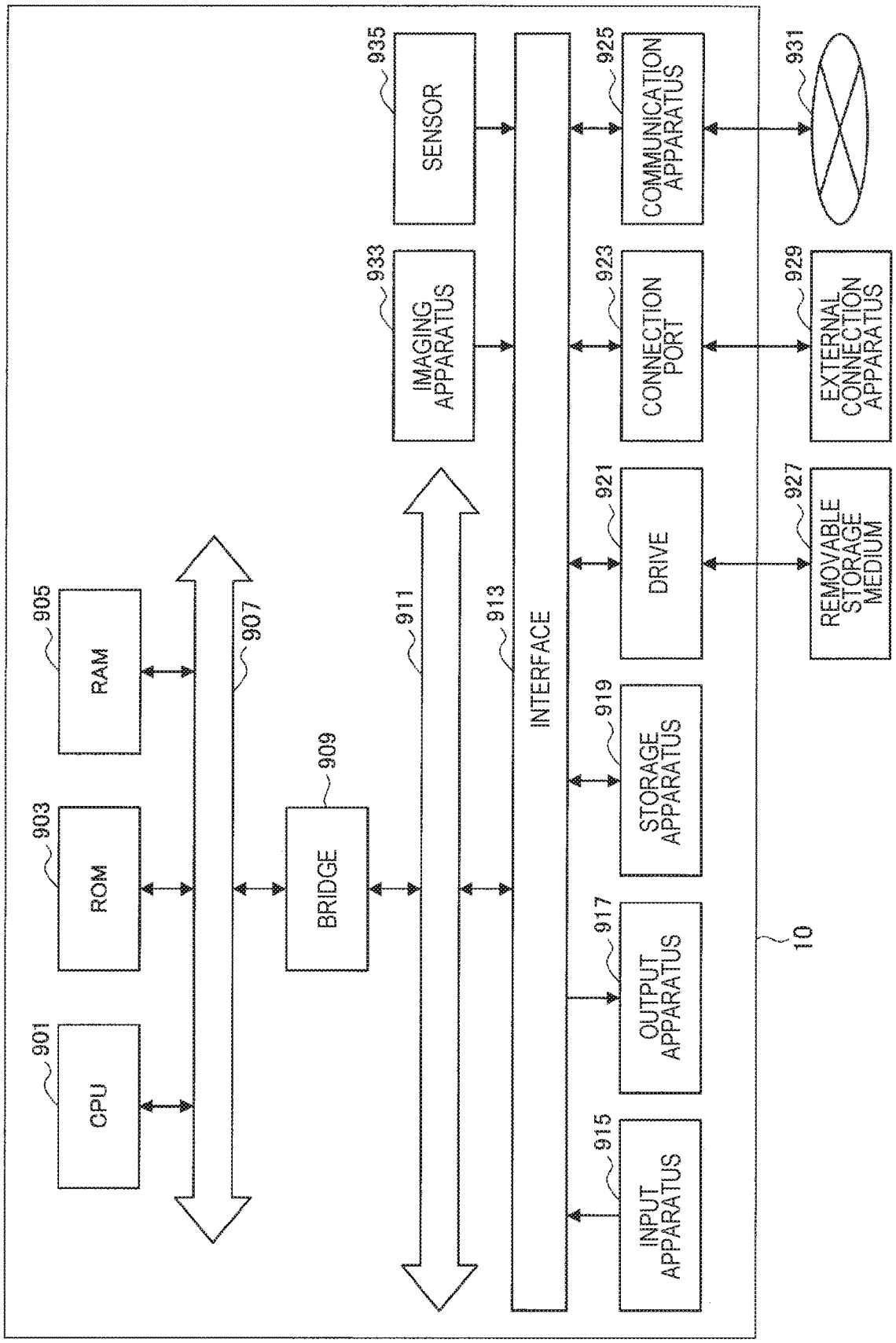

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/065030 filed on May 20, 2016, which claims priority benefit of Japanese Patent Application No. 2015-171760 filed in the Japan Patent Office on Sep. 1, 2015. Each of the above-referenced applications is hereby incorporated herein by reference in its entirety.

TECHNICAL FIELD

The present disclosure relates to an information processing apparatus, an information processing method, and a program.

BACKGROUND ART

Projectors (projection display apparatus) have been known for a long time as display apparatus that display information by projecting a video onto a projection plane such as a screen. Additionally, along with the miniaturization of various devices, miniaturizing the projector itself has also become possible, and in recent years in particular, portable projectors are also being investigated.

In addition, among the projectors described above, projectors capable of automatically controlling a light source for projecting a video in accordance with operating conditions have also been proposed. For example, Patent Literature 1 discloses an example of a projector that turns off a light source automatically in a case of not being in a still state.

CITATION LIST

Patent Literature

Patent Literature 1: JP 2008-185815A

DISCLOSURE OF INVENTION

Technical Problem

On the other hand, as a usage scenario of a projector like one described above, a case may be anticipated in which a user adjusts the position and orientation of the projector itself, and thereby adjusts the display mode, such as the position and size of the video projected by the projector, and the position of the focal point. Under such conditions, the projector is not necessarily limited to a still state, and a control that automatically turns off the light source and stops projecting a video is not necessarily preferable.

Accordingly, the present disclosure proposes an information processing apparatus, an information processing method, and a program capable of controlling operation related to the projection of a video in accordance with usage conditions in a more favorable aspect.

Solution to Problem

According to the present disclosure, there is provided an information processing apparatus including: an acquisition unit configured to acquire a first detection result indicating information regarding at least one of a position and an orientation of a projection unit that causes display information to be display by projecting the display information onto a projection plane, and a second detection result indicating a spatial positional relationship between the projection unit and the projection plane; and a control unit configured to control an operation of the projection unit on a basis of the first detection result and the second detection result.

In addition, according to the present disclosure, there is provided an information processing method including: acquiring a first detection result indicating information regarding at least one of a position and an orientation of a projection unit that causes display information to be display by projecting the display information onto a projection plane, and a second detection result indicating a spatial positional relationship between the projection unit and the projection plane; and controlling, by a processor, an operation of the projection unit on a basis of the first detection result and the second detection result.

In addition, according to the present disclosure, there is provided a program causing a computer to execute: acquiring a first detection result indicating information regarding at least one of a position and an orientation of a projection unit that causes display information to be display by projecting the display information onto a projection plane, and a second detection result indicating a spatial positional relationship between the projection unit and the projection plane; and controlling an operation of the projection unit on a basis of the first detection result and the second detection result.

Advantageous Effects of Invention

According to the present disclosure as described above, there is provided an information processing apparatus, an information processing method, and a program capable of controlling operation related to the projection of a video in accordance with usage conditions in a more favorable aspect.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is an explanatory diagram for explaining an example of control depending on a determination result regarding a state of the information processing apparatus.

FIG. 19 is a block diagram illustrating an exemplary hardware configuration of the information processing apparatus according to the embodiment.

MODE(S) FOR CARRYING OUT THE INVENTION

Figure 1:
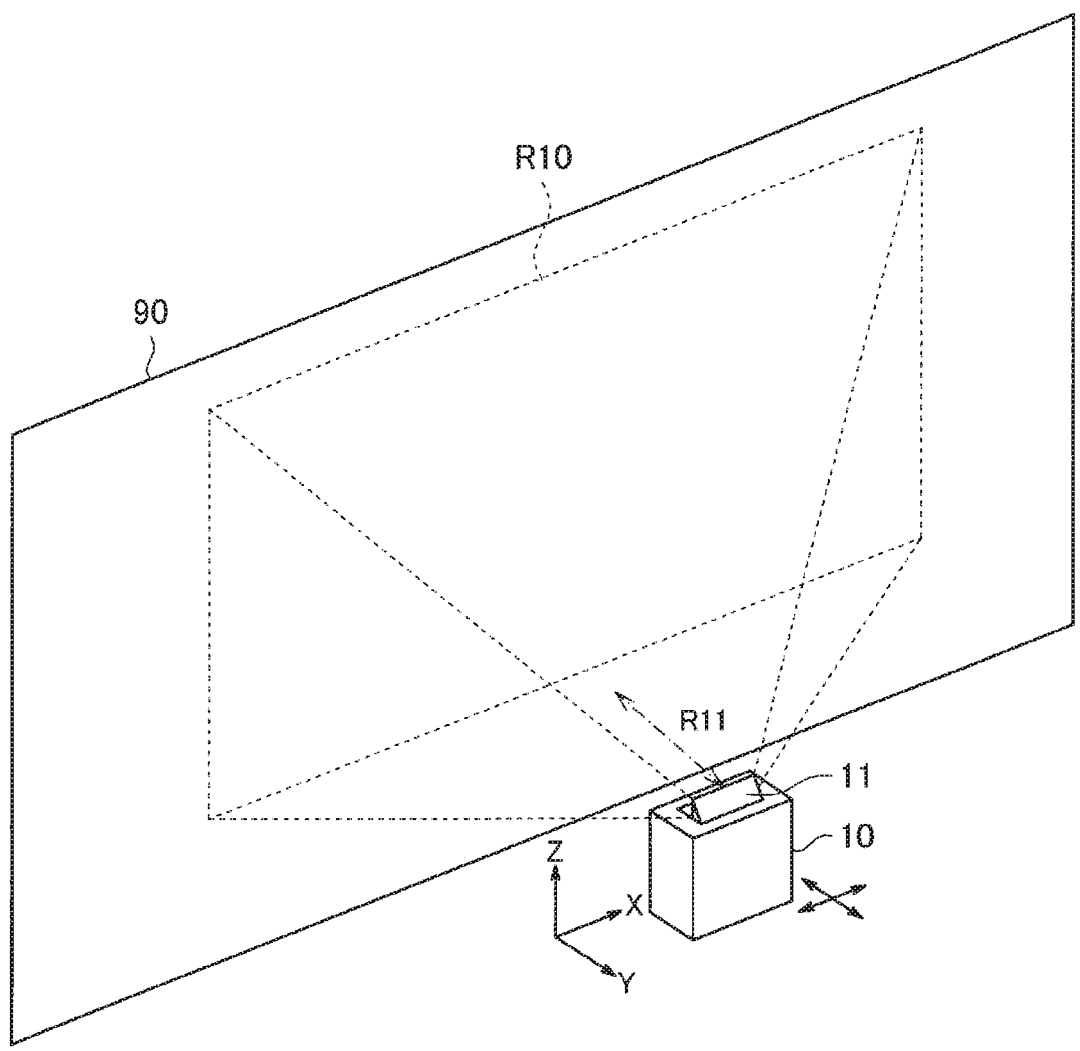
FIG. 1 is an explanatory diagram for explaining an example of a schematic configuration of an information processing apparatus according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.
1. Schematic configuration
2. Exemplary system configuration
3. Functional configuration
4. Processes
5. Modifications
5.1. Modification 1: Example of case of treating horizontal plane as projection plane
5.2. Modification 2: Example of mode in case of detecting user operations with respect to projection plane
5.3. Modification 3: Example of control for reducing power consumption
5.4. Modification 4: Example of control depending on operating environment
5.5. Modification 5: Example of operation in case of controlling multiple projection units
6. Hardware configuration
7. Conclusion

1. SCHEMATIC CONFIGURATION

First, an example of a schematic configuration of an information processing apparatus 10 according to an embodiment of the present disclosure will be described with reference to FIG. 1. FIG. 1 is an explanatory diagram for explaining an example of a schematic configuration of the information processing apparatus 10 according to the present embodiment.

As illustrated in FIG. 1, the information processing apparatus 10 according to the present embodiment includes a configuration (hereinafter called the "projection unit 11" in some cases) corresponding to what is called a projection display apparatus (projector), and by projecting onto a designated projection plane display information to be presented, presents the display information to a user. For example, in the example illustrated in FIG. 1, the projection unit 11 is configured as what is called a single focus projector, which presents display information to a user by treating a wall surface extending in an approximately vertical direction as a projection plane 90, and projecting the display information in an approximately horizontal direction onto the projection plane 90. Note that in the following description, the region in which information (that is, display information) is projected by the projection unit 11 will be called the "projection region R10" in some cases.

In addition, the information processing apparatus 10 according to the present embodiment is configured to be able to detect changes in its own position and orientation (in other words, changes in the position and orientation of the projection unit 11) with various sensors, such as an acceleration sensor and an angular velocity sensor, for example. By using such a configuration, the information processing apparatus 10 is able to detect actions by the user, such as adjusting the placement position and projection direction of the information processing apparatus 10, adjusting the attitude of the information processing apparatus 10, and picking up the information processing apparatus 10, for example.

Note that the information processing apparatus 10 is configured to be able to detect, for example, accelerations imparted to itself for three axis directions which are mutually orthogonal (for example, the respective directions of an x-axis, a y-axis, and a z-axis). Accordingly, in the following description, in the attitude at which the information processing apparatus 10 is projecting a video in an approximately horizontal direction onto a wall surface as illustrated in FIG. 1, the relative directions with respect to the information processing apparatus 10 which correspond to the horizontal direction based on absolute position are taken to be the x-axis direction and the y-axis direction. Also, in the attitude as illustrated in FIG. 1, the relative direction with respect to the information processing apparatus 10 which corresponds to the vertical direction based on absolute position is described as the z-axis direction.

In addition, the information processing apparatus 10 is configured to be able to detect the spatial positional relationship between the projection unit 11 and the projection plane 90. As a more specific example, the information processing apparatus 10 includes what is called a distance measuring sensor capable of measuring distance, such as a stereo image sensor or infrared sensor, for example, and measures a distance R11 between the projection unit 11 and the projection plane 90. By using such a configuration, in the case in which the position or orientation of itself changes, the information processing apparatus 10 becomes able to recognize the change in the positional relationship between the projection unit 11 and the projection plane 90 (for example, the change in the relative positional relationship) corresponding to the change in the position or orientation.

The information processing apparatus 10 according to the present embodiment, by using detection results of various information as described above, recognizes the usage conditions of itself by the user. Note that examples of recognized usage conditions of the information processing apparatus 10 can include a condition in which the user is carrying the information processing apparatus 10 to move the information processing apparatus 10, a condition in which the user is adjusting the position and orientation of the information processing apparatus 10 to adjust the position and size of the projected video, and the like. Subsequently, in accordance with the recognized usage conditions of itself, the information processing apparatus 10 according to the present embodiment executes control of the operations of the projection unit 11, such as control of the amount of light from a light source for projecting a video, or control of a focal position for projecting a video onto the projection plane 90 (so-called autofocus (AF) control) for example. Note that details of the operations by the information processing apparatus 10 will be separately described later.

The above describes an example of a schematic configuration of the information processing apparatus 10 according to an embodiment of the present disclosure with reference to FIG. 1.

2. EXEMPLARY SYSTEM CONFIGURATION

Next, an example of a configuration of a system that includes the information processing apparatus 10 according to the present embodiment will be described. For example, FIG. 2 is an explanatory diagram for explaining an example of a configuration of a system that includes the information processing apparatus 10 according to the present embodiment.

The information processing apparatus 10 according to the present embodiment acquires display information to be projected from an external apparatus different from the information processing apparatus 10, such as a personal computer (PC) or a server, for example. For example, the information processing apparatus 10 may acquire display information to be projected from an external apparatus 91 connected by what is called a cable, or through a wired network such as a local area network (LAN), as indicated as the reference sign N1 in FIG. 2.

Also, as another example, the information processing apparatus 10 may acquire display information to be projected from an external apparatus connected through a wireless network based on a standard such as Bluetooth™, Bluetooth Low Energy (BLE), or Wireless Fidelity (Wi-Fi™), for example. For example, in the example illustrated in FIG. 2, the information processing apparatus 10 is provided with a wireless communication device, and is configured to be able to operate as a master station, such as what is called a Wi-Fi access point (AP), for example. Note that in FIG. 2, the reference sign N2 schematically illustrates the communication range of the wireless communication of the information processing apparatus 10.

Figure 2:
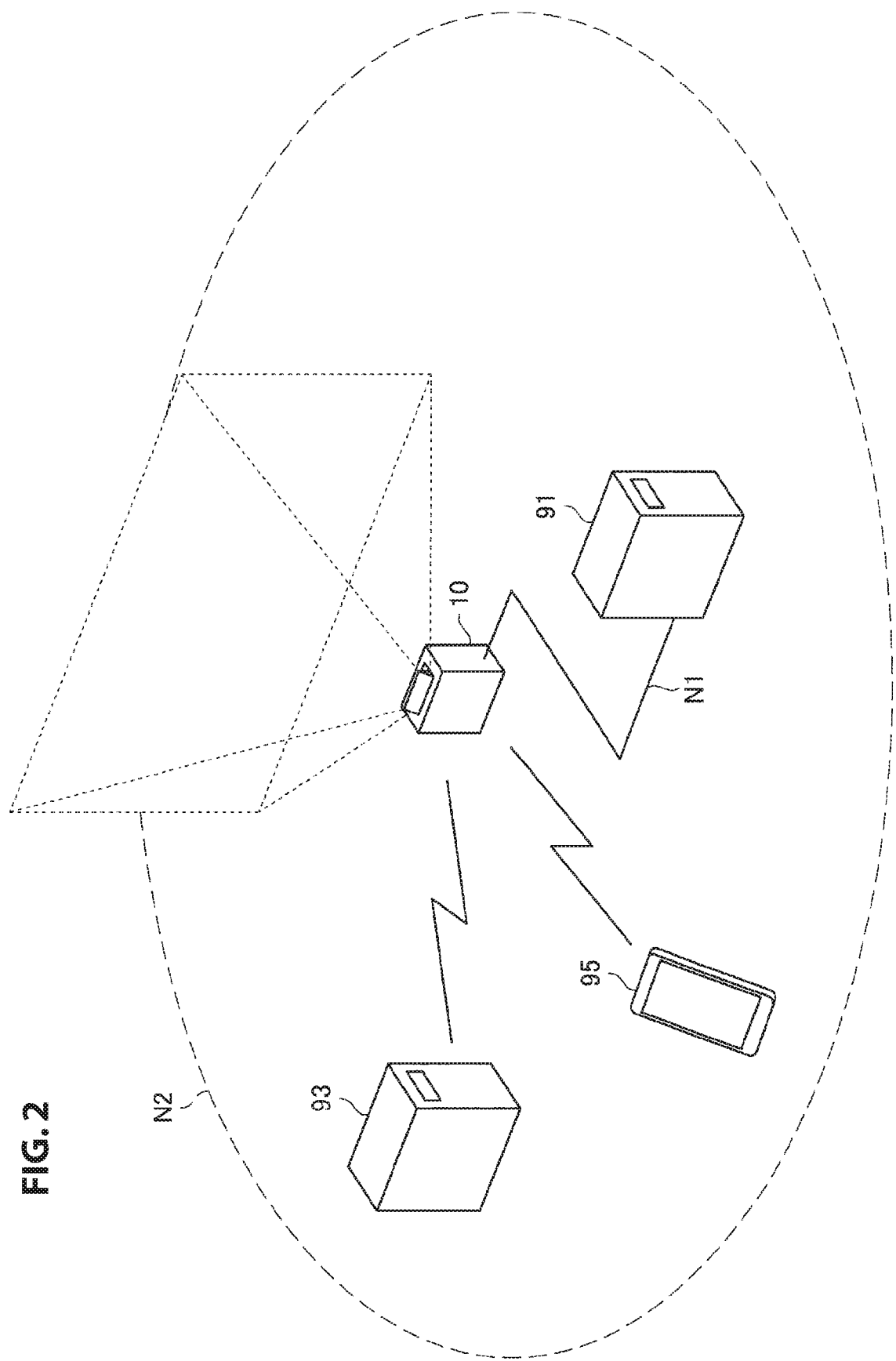
FIG. 2 is an explanatory diagram for explaining an example of a configuration of a system that includes the information processing apparatus according to the embodiment.

In the example illustrated in FIG. 2, the information processing apparatus 10 is configured to be able to communicate through a wireless network with an external apparatus 93 such as a PC provided with a wireless communication device, and a wireless communication terminal 95 such as a smartphone or tablet, which exist within a communication range N2. In this case, the information processing apparatus 10 may also acquire display information to be projected through the wireless network from the external apparatus 93 and the wireless communication terminal 95 which exist within the communication range N2. Additionally, various operations of the information processing apparatus 10 may also be controlled through the wireless network by the external apparatus 93 and the wireless communication terminal 95 which exist within the communication range N2. In this case, it is sufficient for the information processing apparatus 10 to acquire control information indicating the content of a user operation input through the external apparatus 93 or the wireless communication terminal 95, and execute various processes on the basis of the acquired control information, for example.

The above describes an example of the configuration of a system that includes the information processing apparatus 10 according to the present embodiment with reference to FIG. 2.

3. FUNCTIONAL CONFIGURATION

Figure 3:
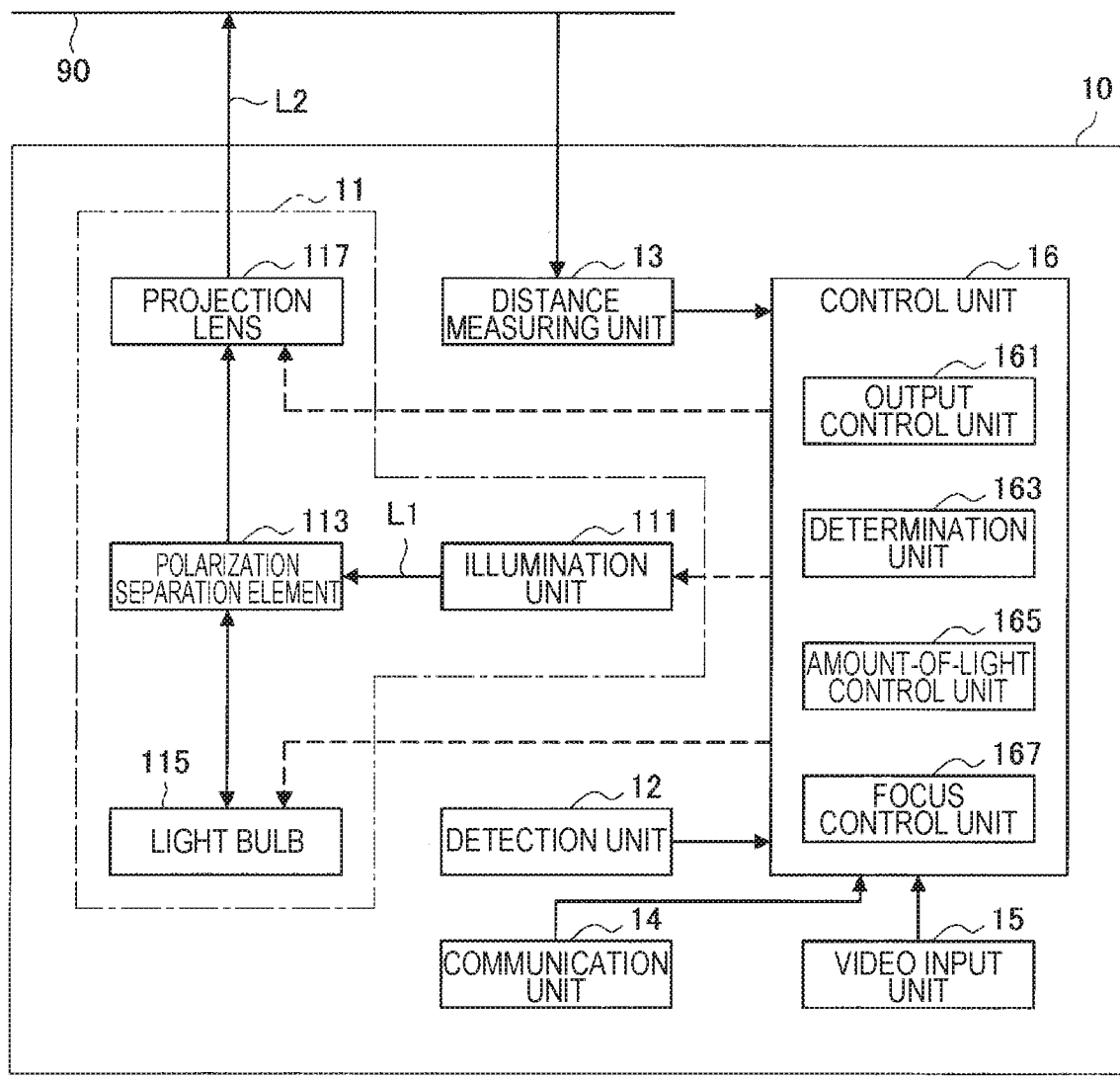
FIG. 3 is a block diagram illustrating an example of a functional configuration of the information processing apparatus according to the embodiment.

Next, FIG. 3 will be referenced to describe an example of a functional configuration of the information processing apparatus 10 according to the present embodiment. FIG. 3 is a block diagram illustrating an example of the functional configuration of the information processing apparatus 10 according to the present embodiment.

As illustrated in FIG. 3, the information processing apparatus 10 according to the present embodiment includes a projection unit 11, a detection unit 12, a distance measuring unit 13, a communication unit 14, a video input unit 15, and a control unit 16.

The projection unit 11, on the basis of control from the control unit 16, projects display information to be presented as a video onto the projection plane 90. The projection unit 11 includes, for example, an illumination unit 111, a polarization separation element 113, a light bulb 115, and a projection lens 117.

The illumination unit 111 emits illuminating light L1 towards the light bulb 115 through the polarization separation element 113. Note that if the illumination unit 111 includes a light source capable of emitting visible light, the configuration is not particularly limited. Note that the light source included in the illumination unit 111 may include laser light sources such as a blue-light laser, a green-light laser, and a red-light laser, for example. Also, as another example, the light source included in the illumination unit 111 may also include a light-emitting diode (LED).

The light bulb 115 may include a reflective liquid crystal element such as liquid crystal on silicon (LCOS), for example. The light bulb 115 modulates a first polarized component (for example, an s-polarized component Ls1 described later) included in the illuminating light L1 on the basis of video data, for example. The polarization state of light modulated by the light bulb 115 is rotated, and the light becomes a second polarized component (for example, a p-polarized component Lp1 described later). This modulated light is emitted towards the projection lens 117 through the polarization separation element 15. Note that the light bulb 115 is also capable of displaying black by being controlled to return incident light (the s-polarized component Ls1) back to the polarization separation element 15 in an unchanged polarization state. The surface shape of the effective area of the light bulb 115 is rectangular, for example.

The projection lens 117 is an optical element for projecting light (video light L2) incident from the light bulb 115 through the polarization separation element 113 onto the projection plane 90. The projection lens 117 may also be configured as an ultra-short focus lens with a throw ratio of 0.38 or less, for example. Herein, the throw ratio is expressed as L/H, where L is the distance from the projection lens 117 to the projection plane 90, and H is the width of the projection region R10.

In addition, by having at least part of the optical members included in the projection lens 117 be driven along the optical axis direction of the projection lens 117 on the basis of control from the control unit 16 described later, the projection lens 117 may be configured to be able to control the focal position of the video projected from the projection lens 117.

The polarization separation element 113 separates incident light into a first polarized component (for example, an s-polarized component) and a second polarized component (for example, a p-polarized component), and emits each in mutually different directions. The polarization separation element 113 includes a polarization beam splitter (PBS), for example, and is configured to selectively reflect the first polarized component, and also selectively transmit the second polarized component. Note that in this description, a case of applying a polarization beam splitter as the polarization separation element 113 is described as an example, but this does not limit the configuration of the polarization separation element 113. As a specific example, the polarization separation element 113 may also include a wire grid. In this case, the characteristics are different from a polarization beam splitter, and of the incident light, the p-polarized component is selectively reflected as the first polarized component, while the s-polarized component is selectively transmitted as the second polarized component.

The polarization separation element 113, by reflecting the first polarized component (s-polarized component Ls1) of the illuminating light L1 from the illumination unit 111, guides the first polarized component (s-polarized component Ls1) towards the light bulb 115. Note that at this time, since the polarization separation element 113 transmits the second polarized component (p-polarized component Lp1) of the illuminating light L1, the second polarized component (p-polarized component Lp1) is not guided to the light bulb 115. Also, the polarization separation element 113, by transmitting a second polarized component (p-polarized component Lp2) of the modulated light from the light bulb 115, guides the second polarized component (p-polarized component Lp2) to the projection lens 117. With this arrangement, a video is projected by the projection unit 11.

The detection unit 12 is configured to include various sensors, and detects changes in the position and orientation of the housing (or the projection unit 11) of the information processing apparatus 10. Note that in the following description, the position and orientation of the housing or the projection unit 11 of the information processing apparatus 10 will simply be called the "position and orientation of the information processing apparatus 10" in some cases.

The detection unit 12 may include an acceleration sensor for detecting acceleration imparted to the information processing apparatus 10, for example. Note that in this description, a sensor that detects relative acceleration (for example, acceleration imparted by moving a target) imparted to the target of acceleration of detection (for example, the information processing apparatus 10, as well as gravitational acceleration (1G) pointing in the vertical direction based on absolute position, is described as being applied as the acceleration sensor. More specifically, the acceleration sensor detects the gravitational acceleration (1G) pointing in the vertical direction in the case in which the information processing apparatus 10 is in a still state. Also, under conditions in which the information processing apparatus 10 is falling, for example, the acceleration sensor detects an acceleration smaller than 1G pointing in the vertical downward direction (during free fall, approximately 0G is detected). Also, when the information processing apparatus 10 is in a picked-up state, that is, when the information processing apparatus 10 is moving upward in the vertical direction based on absolute position (hereinafter also called the "vertical upward direction" in some cases), for example, the acceleration sensor detects an acceleration larger than the gravitational acceleration 1G pointing in the vertical direction. Note that in the following description, particularly in the case of explicitly indicating upward in the vertical direction, the term "vertical upward direction" will be used in some cases. Similarly, in the case of explicitly indicating downward in the vertical direction, the term "vertical downward direction" will be used in some cases.

Note that in the following description, to better clarify the operations of the information processing apparatus 10, the case of simply stating "acceleration" rather than stating "gravitational acceleration" is taken to indicate a relative acceleration (for example, an acceleration imparted by moving a target) imparted to a designated target (for example, the information processing apparatus 10).

In addition, the detection unit 12 may also include an angular velocity sensor for detecting the orientation of the information processing apparatus 10.

The detection unit 12 outputs information indicating a detection result regarding the position (for example, acceleration) and orientation of the information processing apparatus 10 to the control unit 16.

The distance measuring unit 13 is an example of a configuration for detecting the spatial positional relationship between the projection unit 11 and the projection plane 90. The distance measuring unit 13 includes a distance measuring sensor such as a stereo image sensor or an infrared sensor, for example. The distance measuring unit 13 detects the projection plane 90, and measures (detects) the distance R11 between the projection unit 11 and the projection plane 90. Note that if the spatial positional relationship between the projection unit 11 and the projection plane 90 is detectable, the information detected by the distance measuring unit 13 is not necessarily limited to only the distance R11 between the projection unit 11 and the projection plane 90. As a specific example, the distance measuring unit 13 may also detect, for example, the relative orientation of the projection unit 11 with respect to the projection plane 90, such as the inclination of the projection direction of the projection unit 11 with respect to the projection plane, or the inclination of the projection unit 11 with respect to the projection plane in a rotation direction that treats the projection direction as the axis (in other words, inclination in the torsion direction). Note that in the following description, the distance measuring unit 13 is described as detecting the distance R11 between the projection unit 11 and the projection plane 90 as the spatial positional relationship between the projection unit 11 and the projection plane 90.

The distance measuring unit 13 outputs information indicating a measurement result regarding the distance R11 between the projection unit 11 and the projection plane 90 to the control unit 16.

The communication unit 14 is a communication interface by which each component in the information processing apparatus 10 (for example, the control unit 16) communicates with an external apparatus through a network. The network may include the Internet, a dedicated line, a local area network (LAN), a wide area network (WAN), or the like, for example. In addition, the network may be configured as a wireless network, and may also be configured as a wired network. In other words, if the network connects different apparatus to each other, the mode is not particularly limited. Note that in the following description, in the case in which each component in the information processing apparatus 10 transmits or receives information with an external apparatus connected through a network, the transmission and reception of the information is taken to be conducted through the communication unit 14, even in cases in which no particular description is given.

The video input unit 15 is an example of an interface by which each component in the information processing apparatus 10 (for example, the control unit 16) acquires data of the display information to be projected from an external apparatus connected through a cable, for example. The video input unit 15 may include an interface (for example, a connection port) capable of connecting a cable based on a standard such as Video Graphics Array (VGA), Digital Visual Interface (DVI), or High-Definition Multimedia Interface (HDMI™), for example. Note that in the following description, in the case in which each component in the information processing apparatus 10 transmits or receives information with an external apparatus connected through a cable, the transmission and reception of the information is taken to be conducted through the video input unit 15, even in cases in which no particular description is given.

The control unit 16 is a configuration for controlling the operation of each component in the information processing apparatus 10. As illustrated in FIG. 3, the control unit 16 includes, for example, an output control unit 161, a determination unit 163, an amount-of-light control unit 165, and a focus control unit 167.

The output control unit 161 is a configuration for controlling the operation of the projection unit 11 so that the display information to be projected is projected from the projection unit 11. The output control unit 161 acquires, for example, data of the display information to be projected from an external apparatus connected through a cable. Also, as another example, the output control unit 161 may acquire data of the display information to be projected from an external apparatus connected through a wired or wireless network.

The output control unit 161, causes the light bulb 115 to modulate the illuminating light L1 from the illumination unit 111 on the basis of the data of the display information to be projected, for example, thereby causing the projection unit 11 to project a video in which the display information is presented. Additionally, at this time, the output control unit 161 may also cause the amount-of-light control unit 165 described later to control the amount of light of the illumination unit 111, and thereby control the brightness of the video projected from the projection unit 11. Additionally, the output control unit 161 may also cause the focus control unit 167 described later to control the focal position of the video.

The amount-of-light control unit 165 is a configuration for controlling the amount of illuminating light L1 emitted from the illumination unit 111. For example, the amount-of-light control unit 165 controls the amount of illuminating light L1 on the basis of an instruction from the output control unit 161. In addition, the amount-of-light control unit 165 may also control the amount of illuminating light L1 on the basis of a determination result regarding the state of the information processing apparatus 10 by the determination unit 163 described later. Note that details of operations related to the control of the amount of illuminating light L1 in accordance with a determination result by the determination unit 163 will be separately described later in conjunction with the description of the determination unit 163.

The focus control unit 167 drives at least part of the optical members included in the projection lens 117 along the optical axis direction of the projection lens 117, and thereby controls the focal position of the video projected from the projection lens 117 (for example, executes AF control). For example, the focus control unit 167 may also control the focal position on the basis of an instruction from the output control unit 161. In addition, the focus control unit 167 may also control the focal position on the basis of a determination result regarding the state of the information processing apparatus 10 by the determination unit 163 described later. Note that details of operations related to the control of the focal position in accordance with a determination result by the determination unit 163 will be separately described later in conjunction with the description of the determination unit 163.

The determination unit 163 acquires information indicating a detection result regarding the position (for example, acceleration) and orientation of the information processing apparatus 10 from the detection unit 12. Also, the determination unit 163 acquires information indicating a detection result regarding the distance R11 between the projection unit 11 and the projection plane 90 from the distance measuring unit 13. Note that in the following description, a detection result regarding the position (for example, acceleration) of the information processing apparatus 10 and a detection result regarding the orientation of the information processing apparatus 10 will simply be called the "detection result regarding the position" and the "detection result regarding the orientation" in some cases.

Also, a measurement result (detection result) regarding the distance R11 between the projection unit 11 and the projection plane 90 will simply be called the "measurement result regarding the distance" in some cases. Note that the "detection result regarding the position" and the "detection result regarding the orientation" correspond to an example of a "first detection result". Also, the "measurement result regarding the distance" corresponds to an example of a "second detection result".

On the basis of the acquired first detection result and second detection result, the determination unit 163 determines the state or condition of the information processing apparatus 10 (hereinafter collectively called the "state of the information processing apparatus 10" in some cases), such as the usage conditions of the information processing apparatus 10 by a user, for example. As a specific example, the determination unit 163 determines whether the information processing apparatus 10 is in a still state or a state of motion (hereinafter called a "moving state" in some cases), on the basis of the magnitude of acceleration imparted to the information processing apparatus 10 and the magnitude of change in the distance between the projection unit 11 and the projection plane 90. Subsequently, the determination unit 163 outputs a determination result regarding the state of the information processing apparatus 10 to the amount-of-light control unit 165 and the focus control unit 167. With this arrangement, the amount-of-light control unit 165 becomes able to control the amount of illuminating light L1 emitted from the illumination unit 111 in accordance with the determination result regarding the state of the information processing apparatus 10. Similarly, the focus control unit 167 becomes able to control the focal position of the video projected from the projection lens 117 (for example, execute AF control) in accordance with the determination result regarding the state of the information processing apparatus 10.

For example, FIG. 4 is an explanatory diagram for explaining an example of control in accordance with a determination result regarding the state of the information processing apparatus 10, and illustrates an example of operations related to the control of the amount of illuminating light L1. For example, in the example illustrated in FIG. 4, the determination unit 163 evaluates the magnitude of the acceleration imparted to the information processing apparatus 10 by classifying the acceleration into the three stages of "large", "medium", and "small". In addition, regarding the distance R11 between the projection unit 11 and the projection plane 90, the determination unit 163 evaluates whether or not the distance is measurable, and in the case of being measurable, the determination unit 163 evaluates the change in the distance R11 as "large" or "small". Note that a state in which the distance R11 is not measurable corresponds to a state in which a body that acts as a distance measurement target (for example, a real object such as the projection plane 90) does not exist within the detection range of the distance measuring unit 13. Subsequently, the determination unit 163 determines the state of the information processing apparatus 10 on the basis of an evaluation value corresponding to acceleration and an evaluation value corresponding to the measurement result regarding the distance R11.

As a specific example, in the case in which the acceleration is "large", the determination unit 163 determines that the information processing apparatus 10 is in a moving state, such as a state in which a user is picking up and carrying the information processing apparatus 10, or a state in which the information processing apparatus 10 falling from a stand on which the information processing apparatus 10 had been placed, for example. In this way, in the case in which the information processing apparatus 10 is in a moving state (that is, a condition of being in motion), it is assumed that the user is not intentionally causing the information processing apparatus 10 to project a video. For this reason, in the case of determining that the information processing apparatus 10 is in a moving state, the amount-of-light control unit 165 lowers the amount of illuminating light L1 emitted from the illumination unit 111, or turns off the illumination unit 111 (that is, limits the amount of illuminating light L1). Note that whether to lower the amount of illuminating light L1 or turn off the illumination unit 111 may be preset in accordance with an applied law or the like, or selectively switched on the basis of a user operation, for example.

In the case in which the acceleration is "small", the determination unit 163 determines that the information processing apparatus 10 is in a still state. In this way, under conditions in which the information processing apparatus 10 is in a still state and the information processing apparatus 10 is projecting a video, the amount-of-light control unit 165 maintains the turned-on state of the illumination unit 111. Note that even in conditions in which the information processing apparatus 10 is projecting a video, cases in which the information processing apparatus 10 vibrates slightly or the like in accordance with the surrounding environment may also be anticipated. For this reason, it is advisable to decide a threshold value for determining that the acceleration is "small" so that the amount of illuminating light L1 emitted from the illumination unit 111 is not limited even in cases in which slight vibrations occur (in other words, it is advisable to provide a dead zone).

In the case in which the acceleration is "medium", the determination unit 163 determines whether or not the information processing apparatus 10 is in a still state in accordance with the measurement result regarding the distance R11 between the projection unit 11 and the projection plane 90. Specifically, in the case in which the acceleration is "medium" and the change in the distance R11 is "small", it may be assumed that the user is adjusting the position and orientation of the information processing apparatus 10 to thereby adjust the display mode, such as the position and size of the projected video, and the position of the focal point, for example. For this reason, in this case, the determination unit 163 may determine that the information processing apparatus 10 is in a still state. Additionally, on the basis of the determination result, the amount-of-light control unit 165 may also maintain the turned-on state of the illumination unit 111. Also, as another example, under such conditions, the determination unit 163 may make a distinction from the still state, and determine a state in which the user is adjusting the display mode of the video. In this case, for example, the amount-of-light control unit 165 may also restrain the amount of illuminating light L1 in a range in which the video projected onto the projection plane 90 can be distinguished. In other words, in this case, the amount-of-light control unit 165 restrains the amount of illuminating light L1 within a range where the amount of restraint is less than the case of a moving state.

Also, in the case in which the acceleration is "medium" and the change in the distance R11 is "large", it may be assumed that the position and orientation of the information processing apparatus 10 have changed more greatly than under conditions in which the display mode of the projected video is adjusted. For this reason, in the example illustrated in FIG. 4, the determination unit 163 determines that the information processing apparatus 10 is in a moving state. Additionally, on the basis of the determination result, the amount-of-light control unit 165 limits the amount of illuminating light L1 emitted from the illumination unit 111.

Also, the case in which the acceleration is "medium" and the distance R11 is not measurable corresponds to a state in which the projection plane 90 is not being detected, and it may be assumed that presenting display information to the user by projecting a video is difficult. For this reason, in the example illustrated in FIG. 4, the determination unit 163 determines that the information processing apparatus 10 is in a moving state. Additionally, on the basis of the determination result, the amount-of-light control unit 165 limits the amount of illuminating light L1 emitted from the illumination unit 111.

Note that in the example illustrated in FIG. 4, the determination unit 163 evaluates the magnitude of the acceleration imparted to the information processing apparatus 10 by classifying the acceleration into the three stages of "large", "medium", and "small", but the determination unit 163 is not necessarily limited to the same aspect. As a specific example, in the case in which the acceleration is "medium" or greater (that is, cases in which the acceleration is "medium" and "large") in the example illustrated in FIG. 4, the determination unit 163 may treat the acceleration as "medium", and thereby classify the acceleration into the two stages of "medium" and "small".

In addition, in the case of detecting acceleration pointing in a specific direction, the determination unit 163 may also control the amount of illuminating light L1 emitted from the illumination unit 111. For example, under conditions in which the user picks up the information processing apparatus 10 to move the information processing apparatus 10, an acceleration larger than the gravitational acceleration (1G) pointing in the vertical direction is detected. For this reason, in the case in which the acceleration pointing in the vertical direction becomes equal to or greater than a threshold value, the determination unit 163 may determine that the user has picked up the information processing apparatus 10, and limit the amount of illuminating light L1 emitted from the illumination unit 111. Also, as another example, cases in which information processing apparatus 10 is falling from a stand or the like may also be anticipated. For this reason, in the case of recognizing that the information processing apparatus 10 is in a falling state on the basis of a change in the acceleration pointing in the vertical direction, the determination unit 163 may limit the amount of illuminating light L1.

Additionally, under conditions in which the distance R11 between the projection unit 11 and the projection plane 90 changes frequently, such as in the case in which the information processing apparatus 10 is in a moving state, or the case in which the user is adjusting the position and orientation of the information processing apparatus 10, if the AF function operates every time the distance R11 changes, the display mode (for example, the projected size) of the projected video will change frequently, which may be undesirable in some cases. For this reason, on the basis of a notification from the determination unit 163, the focus control unit 167 may execute the AF control in the case in which the acceleration remains in a "small" state and the change in the distance R11 remains in the "small" state (for example, the still state) for a designated period or more.

Additionally, conditions in which the information processing apparatus 10 is used by being affixed to a designated pedestal are also anticipated, and under conditions in which the information processing apparatus 10 is placed on the pedestal, the distance between the projection unit 11 and the projection plane 90 may be kept at a designated distance in some cases. For this reason, for example, in the case in which the information processing apparatus 10 stops the projection of a video by turning off the illumination unit 111, and resumes the projection of a video by turning on the illumination unit 111 again, if the focal position is controlled by AF control or the like every time, the display mode (for example, the projected size) of the projected video will change, which may be undesirable in some cases. For this reason, the focus control unit 167 may record a measurement result regarding the distance R11 in the case of executing the AF control, and in the case in which the difference between the recorded distance R11 and a newly detected distance R11 becomes equal to or greater than a threshold value, the focus control unit 167 may execute the AF control in accordance with a determination result regarding the change in the distance R11.

In addition, in the case of recognizing the still state after limiting the amount of illuminating light L1 emitted from the illumination unit 111, the information processing apparatus 10 may switch the illumination unit 111 back to the turned-on state (that is, increase the limited amount of illuminating light L1).

Note that in the case of switching the illumination unit 111 back to the turned-on state from a state in which the amount of illuminating light L1 is limited, the information processing apparatus 10 may not increase the amount of illuminating light L1 suddenly, but instead increase the amount of illuminating light L1 gradually over a designated time. By such a control, even in the case of producing conditions in which the user is peering into the projection unit 11 in relation to the turning off of the illumination unit 111, it becomes possible to prevent a situation in which the user's face is illuminated by illuminating light L1 having a high luminance.

Also, as another example, in the state in which the amount of illuminating light L1 is limited, the information processing apparatus 10 may switch the illumination unit 111 back to the turned-on state only in the case of receiving an explicit operation from the user. Note that it is desirable for the operation from the user in this case to be an operation enabling the user to instruct the information processing apparatus 10 to switch the illumination unit 111 back to the turned-on state more explicitly, such as a switch or button operation. For this reason, an operation that is somewhat more complicated than other operations may be set as the operation, for example.

Note that the processes related to the determination of the state of the information processing apparatus 10 and the processes related to various controls based on the determination results described above are merely one example, and the processes are not necessarily limited to the above example. For this reason, another example of processes related to the determination of the state of the information processing apparatus 10 and processes related to various controls based on the determination results will be separately described later.

Also, the configuration of the information processing apparatus 10 illustrated in FIG. 3 is merely one example, and the information processing apparatus 10 is not necessarily limited to the same configuration. As a specific example, the projection unit 11, the detection unit 12, and the distance measuring unit 13 may also be provided externally to the information processing apparatus 10. Also, at least part of the configuration of the control unit 16 may be provided in an external apparatus different from the information processing apparatus 10, such as a server connected through a network, for example.

The above describes an example of a functional configuration of the information processing apparatus 10 according to the present embodiment with reference to FIGS. 3 and 4.

4. PROCESSES

Next, an example of the flow of a series of processes by the information processing apparatus 10 according to the present embodiment will be described, with particular focus on the operations of the control unit 16.

[Overall Process Flow]

Figure 5:
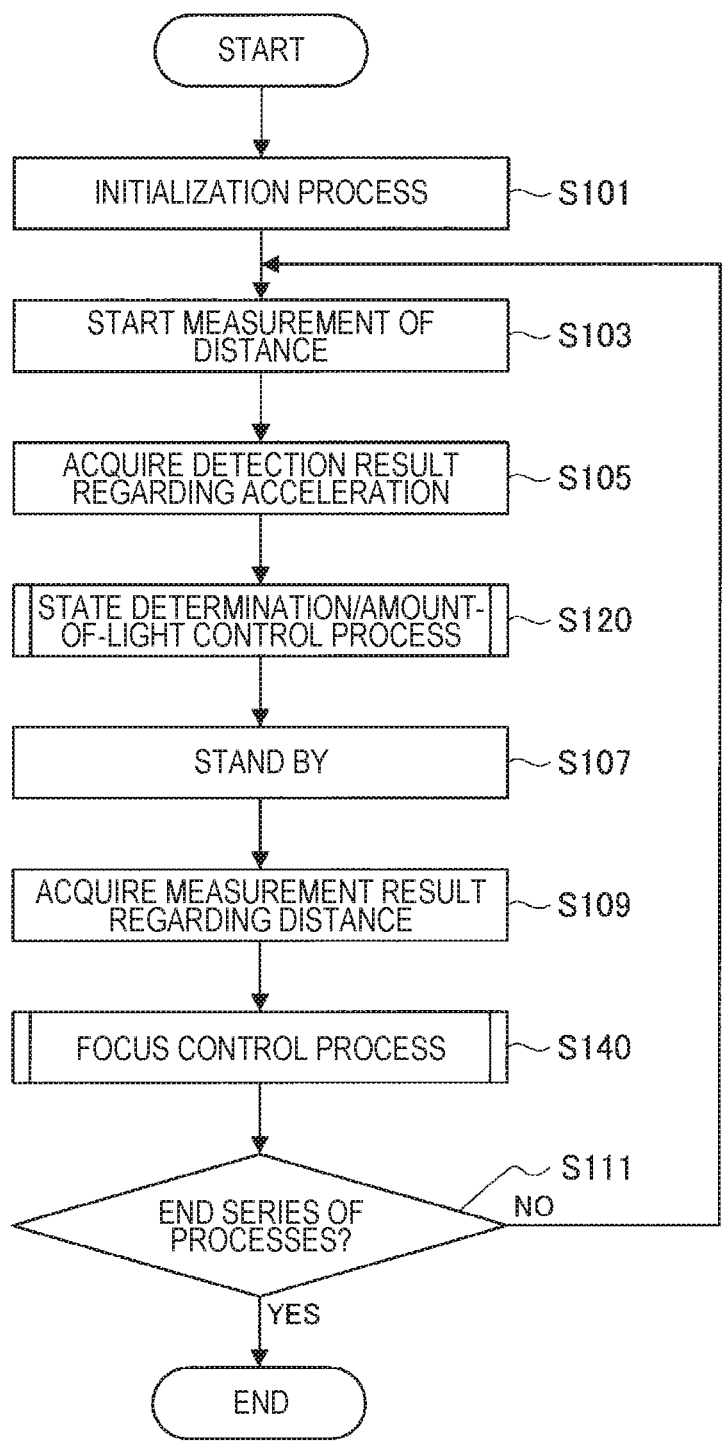
FIG. 5 is a flowchart illustrating an example of the flow of an overall process of an information processing apparatus according to the embodiment.

First, an example of the overall process flow of the information processing apparatus 10 according to the present embodiment will be described with reference to FIG. 5. FIG. 5 is a flowchart illustrating an example of the flow of a series of processes by the information processing apparatus 10 according to the present embodiment, and illustrates an example of the overall process flow of the information processing apparatus 10.

(Step S101)

When booted up, the information processing apparatus 10 first executes a device initialization process for realizing various functions, such as the projection of a video and the detection of various information (for example, acceleration detection and distance measurement).

(Step S103)

After the initialization process is completed, the information processing apparatus 10 starts processes related to the detection of the projection plane 90, and the measurement of the distance R11 between the projection unit 11 and the projection plane 90. Note that in some cases, the processes related to the measurement of the distance R11 by the information processing apparatus 10 (distance measuring unit 13) take a relatively longer time compared to the processes related to the detection of other states (such as the acceleration, for example). For this reason, in this description, the information processing apparatus 10 is described as executing other processes in parallel while executing the processes related to the measurement of the distance R11.

Note that, although described later in detail, the information processing apparatus 10 successively and repeatedly executes the processes related to the measurement of the distance R11, and records measurement results regarding the distance R11 in a storage area readable by itself. For this reason, under conditions in which the processes related to the measurement of the distance R11 have already been completed once or more, at the timing indicated in step S103, at least a measurement result regarding the distance R11 acquired previously is recorded in the storage area.

(Step S105)

In addition, the information processing apparatus 10 acquires a detection result regarding the acceleration and the angular velocity by the detection unit 12 as information indicating changes in the position and orientation of itself (or the projection unit 11).

(Step S120)

Subsequently, on the basis of the detection result regarding the acceleration and the angular velocity as well as the measurement result regarding the distance R11 between the projection unit 11 and the projection plane 90 acquired at this time, the information processing apparatus 10 executes processes related to the state determination regarding the state of the information processing apparatus 10 (for example, a determination of the still state or not), and the control of the amount of illuminating light L1 emitted from the illumination unit 111 based on the result of the state determination.

Note that at this time, a measurement result regarding the distance R11 between the projection unit 11 and the projection plane 90 may not have been acquired in some cases. As a specific example, a measurement result regarding the distance R11 has not been acquired when the distance R11 is being measured for the first time (that is, in the case in which the processes related to the measurement of the distance R11 have not been completed), and the case in which the projection plane 90 was not detected (the projection plane 90 did not exist within the detection range) when the distance R11 was measured previously. In such cases, the information processing apparatus 10 may recognize conditions in which the measurement of the distance R11 is unavailable, and execute the processes related to the state determination. Note that details regarding the processes related to step S120 will be separately described later.

(Steps S107, S109)

After the control of the amount of illuminating light L1 is completed, the information processing apparatus 10 stands by for a designated period. During this period, the processes related to the measurement of the distance R11 between the projection unit 11 and the projection plane 90 which were started in step S103 are completed (S107). Subsequently, the information processing apparatus 10 acquires a measurement result regarding the distance R11 between the projection unit 11 and the projection plane 90 by the distance measuring unit 13.

(Step S140)

Next, on the basis of the determination result regarding the state of itself and the measurement result regarding the distance R11 between the projection unit 11 and the projection plane 90 acquired at this time, the information processing apparatus 10 executes processes related to the control of the focal position of the video projected from the projection lens 117. Note that details regarding the processes related to step S140 will be separately described later.

(Step S111)

Subsequently, the information processing apparatus 10 successively executes the series of processes according to steps S103 to S140 until instructed to end the series of processes (S111, NO). With this arrangement, the detection result regarding the position and orientation of the information processing apparatus 10 and the measurement result regarding the distance R11 between the projection unit 11 and the projection plane 90 are updated successively, and on the basis of the updated results, respective processes related to the determination of the state of the information processing apparatus 10, the control of the amount of illuminating light L11, and the control of the focal position are executed. Subsequently, if an instruction to end the series of processes is received, for example, from the user through an operating unit (such as a power switch, for example) (S111, YES), the information processing apparatus 10 ends execution of the series of processes according to steps S103 to S140.

Note that the execution timings in the case of the information processing apparatus 10 successively executing the series of processes according to steps S103 to S140 are not particularly limited. For example, the information processing apparatus 10 may also execute the series of processes according to steps S103 to S140 at intervals of a designated timing. Also, as another example, the information processing apparatus 10 may execute the series of processes according to steps S103 to S140 in tandem with the execution of a designated process (in other words, in tandem with a designated event). Also, as another example, the information processing apparatus 10 may execute the series of processes according to steps S103 to S140 in tandem with a change of a designated state. As a more specific example, in the case in which the acceleration and angular velocity are detected in relation to changes in the position and orientation of itself, the information processing apparatus 10 may execute the series of processes according to steps S103 to S140 in tandem with the detection.

The above describes an example of the overall process flow of the information processing apparatus 10 according to the present embodiment with reference to FIG. 5.

[State Determination/Amount-of-Light Control Process]

Figure 6:
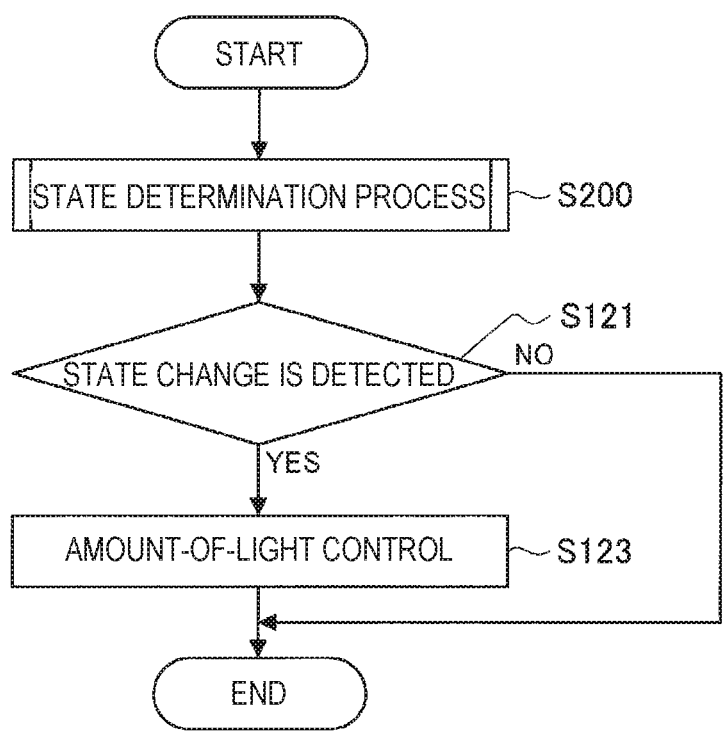
FIG. 6 is a flowchart illustrating an example of the flow of a state determination/amount-of-light control process of the information processing apparatus according to the embodiment.

Next, an example of the flow of the state determination/amount-of-light control process labeled with the reference sign S120 in FIG. 5 will be described with reference to FIG. 6. FIG. 6 is a flowchart illustrating an example of the flow of a process of the information processing apparatus 10 according to the present embodiment, and illustrates an example of the flow of the state determination/amount-of-light control process. Note that the description herein primarily focuses on the control of the amount of illuminating light L11, while details of the determination of the state of the information processing apparatus 10 (such as the determination of the still state or not, for example) will be separately described later.

(Step S200)

First, the information processing apparatus 10 determines the state of itself, on the basis of the detection result regarding the acceleration and angular velocity, and the detection result regarding the distance R11 between the projection unit 11 and the projection plane 90. Note that details regarding the processes related to step S200 will be separately described later.

(Step S123)

Next, in the case of detecting a change in the state of itself (S121, YES), the information processing apparatus 10 controls the amount of illuminating light L1 emitted from the illumination unit 111. For example, in the case of determining that itself is in the moving state, the information processing apparatus 10 limits the amount of illuminating light L1 from the illumination unit 111. Also, in the case of determining that itself is in the still state, the information processing apparatus 10 may maintain the turned-on state of the illumination unit 111. Note that in the case of determining that itself is in the still state, if the amount of illuminating light L1 from the illumination unit 111 is being limited, the information processing apparatus 10 may also switch the illumination unit 111 back to the turned-on state.

Note that, as an example of more detailed operations by the information processing apparatus 10 and related to the control of the amount of illuminating light L1 depending on the state of the information processing apparatus 10, the example described above, for example, with reference to FIG. 4 may be cited. Namely, in the case in which the acceleration is "small", the information processing apparatus 10 determines the still state, and maintains the turned-on state of the illumination unit 111. Also, in the case in which the acceleration is "large", the information processing apparatus 10 determines the moving state, and limits the amount of illuminating light L1. Also, in the case in which the acceleration is "medium", the information processing apparatus 10 controls the amount of illuminating light L1 in accordance with the detection result regarding the distance R11 between the projection unit 11 and the projection plane 90. For example, in the case in which the acceleration is "medium" and the change in the distance R11 is "small", the information processing apparatus 10 determines the still state, and maintains the turned-on state of the illumination unit 111. On the other hand, in the case in which the acceleration is "medium" and the change in the distance R11 is "large", the information processing apparatus 10 determines the moving state, and controls the amount of illuminating light L1.

Note that in the case in which a change in the state of itself is not detected, that is, in the case in which a state similar to the previous determination is ongoing (S121, NO), the information processing apparatus 10 may also not execute the process related to the control of the amount of illuminating light L1 (S123).

The above references FIG. 6 to describe an example of the flow of the state determination/amount-of-light control process labeled with the reference sign S120 in FIG. 5.

[Focus Control Process]

Figure 7:
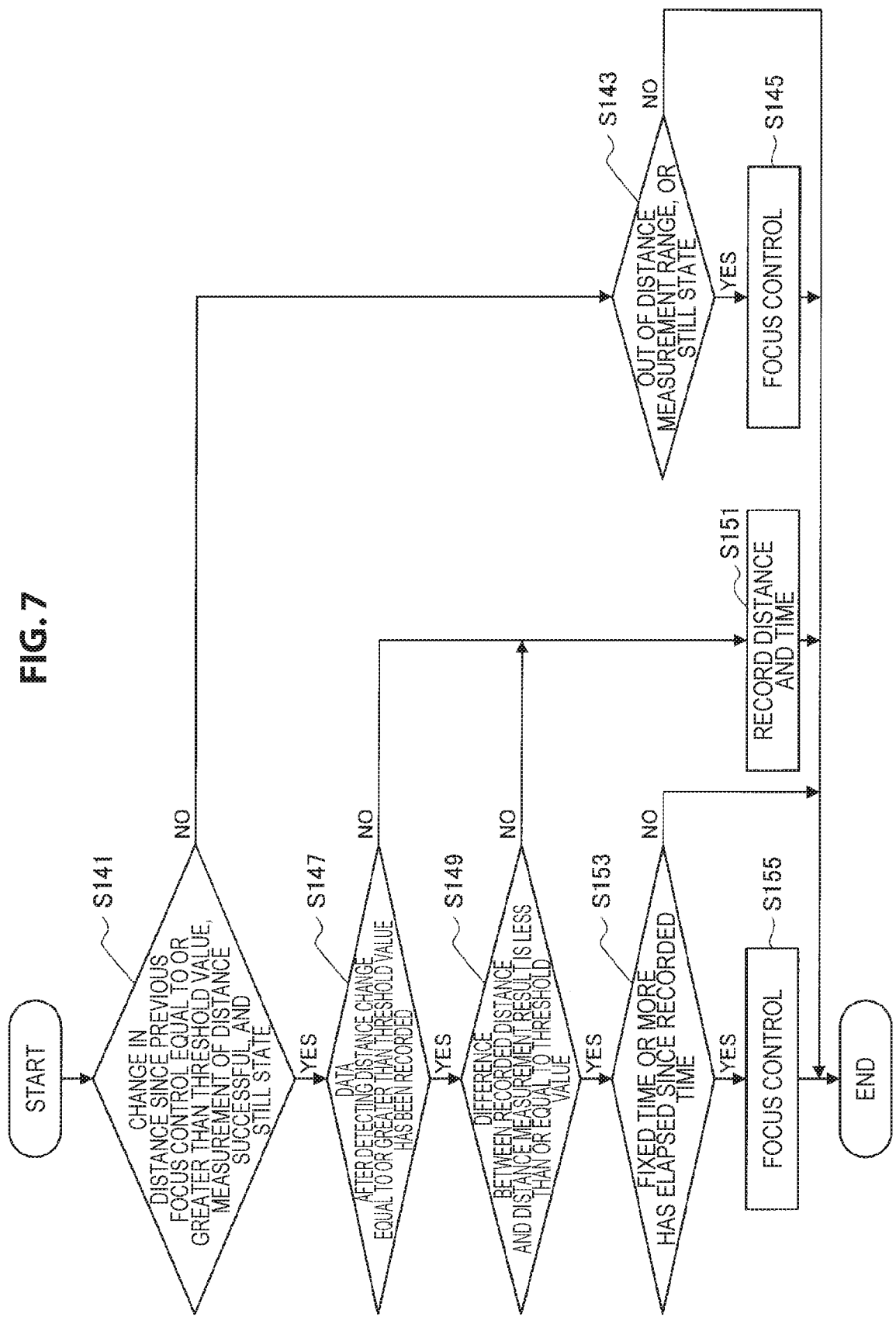
FIG. 7 is a flowchart illustrating an example of the flow of a focus control process of the information processing apparatus according to the embodiment.

Next, an example of the flow of the focus control process labeled with the reference sign S140 in FIG. 5 will be described with reference to FIG. 7. FIG. 7 is a flowchart illustrating an example of the flow of a process of the information processing apparatus 10 according to the present embodiment, and illustrates an example of the flow of the focus control process. Note that, as described earlier with reference to FIG. 5, the process illustrated in FIG. 7 is executed successively (for example, at intervals of a designated timing) by the information processing apparatus 10. In addition, the information processing apparatus 10 executes the various processes described below, in accordance with the state at the time.

(Step S141)

First, the information processing apparatus 10 determines whether or not the state of itself is the still state, the distance R11 between the projection unit 11 and the projection plane 90 has been measured successfully, and the change in the distance R11 since the previous focus control (that is, the control of the focal position) is equal to or greater than a threshold value.

(Steps S143, S145)

In the case in which the condition of step S141 is not satisfied (S141, NO), the information processing apparatus 10 determines whether or not at least one of being out of measurement range of the distance R11 (in other words, a state in which the projection plane 90 is not detected) and being in the still state applies (S143). In the case of being out of measurement range of the distance R11 or being in the still state (S143, YES), the information processing apparatus 10 controls the focal position of the video projected from the projection lens 117. At this time, since the state in which the projection plane 90 is not detected may apply, the information processing apparatus 10 controls the focal position by driving at least part of the optical members included in the projection lens 117 to bring into focus a position corresponding to the maximum projection distance, for example (S145). Note that in the case in which the condition of step S143 is not satisfied (S143, NO), the information processing apparatus 10 does not execute the process related to the control of the focal position.

(Steps S147, S151)

In the case in which the condition in step S141 is satisfied (S141, YES), the information processing apparatus 10 next confirms whether or not data corresponding to a state after detecting that the change in the distance R11 has become equal to or greater than the threshold value is recorded in a designated storage area (a storage area readable by the information processing apparatus 10) (S147). Note that the data includes information indicating a measurement result regarding the distance R11 after the change, and information indicating the time when the distance R11 was measured, for example. Herein, in the case in which the determination is conducted for the first time after detecting that the change in the distance R11 has become equal to or greater than the threshold value, corresponding data is not recorded. For this reason, in the case in which corresponding data is not recorded in the designated storage area (S147, NO), the information processing apparatus 10 records information indicating a measurement result regarding the distance R11 and information indicating the time when the distance R11 was measured in the designated storage area as data (S151).

(Steps S149, S151)

Also, in the case in which corresponding data is recorded in the designated storage area (S147, YES), the information processing apparatus 10 determines whether or not the difference between the measurement result regarding the distance R11 already recorded as the data and the newly measured distance R11 is less than or equal to a threshold value (S149). Note that in the case in which the difference between the already recorded measurement result regarding the distance R11 and the newly acquired measurement result regarding the distance R11 exceeds the threshold value (S149, NO), it is assumed that the movement of the information processing apparatus 10 is ongoing, and the distance R11 between the projection unit 11 and the projection plane 90 is changing greatly. For this reason, in this case, the information processing apparatus 10 records information indicating the newly acquired measurement result regarding the distance R11 and information indicating the time when the distance R11 was measured in the designated storage area as new data (S151).

(Steps S153, S155)

Subsequently, in the case in which the difference between the already recorded measurement result regarding the distance R11 and the newly acquired measurement result regarding the distance R11 is less than or equal to the threshold value (S149, YES), the information processing apparatus 10 determines whether or not a designated period has elapsed since the time recorded as the data (that is, the time when the distance R11 recorded in the data was measured) (S153). In the case in which the designated period has already elapsed since the time recorded as the data (S153, YES), the information processing apparatus 10 controls the focal position of the video projected from the projection lens 117 (that is, executes the AF control) on the basis of the measurement result regarding the distance R11 recorded as the data, or the newly acquired measurement result regarding the distance R11. Note that the designated period in this determination may be set to approximately 1000 msec, for example.

Note that in the case in which the designated period has not elapsed since the time recorded as the data (S153, NO), the information processing apparatus 10 does not execute the control of the focal position. In this case, the state in which the difference between the already recorded measurement result regarding the distance R11 and the newly acquired measurement result regarding the distance R11 is less than or equal to the threshold value continues thereafter, and the information processing apparatus 10 executes the control of the focal position after the designated period elapses.

As above, in the case in which the change in the distance R11 from the previous focus control exceeds the threshold value, the information processing apparatus 10 monitors the change in the distance R11 until the distance R11 stabilizes, and newly executes the focus control (AF control) after the stabilization of the distance R11.

The above references FIG. 7 to describe an example of the flow of the focus control process labeled with the reference sign S140 in FIG. 5.

[State Determination Process]

Figure 8:
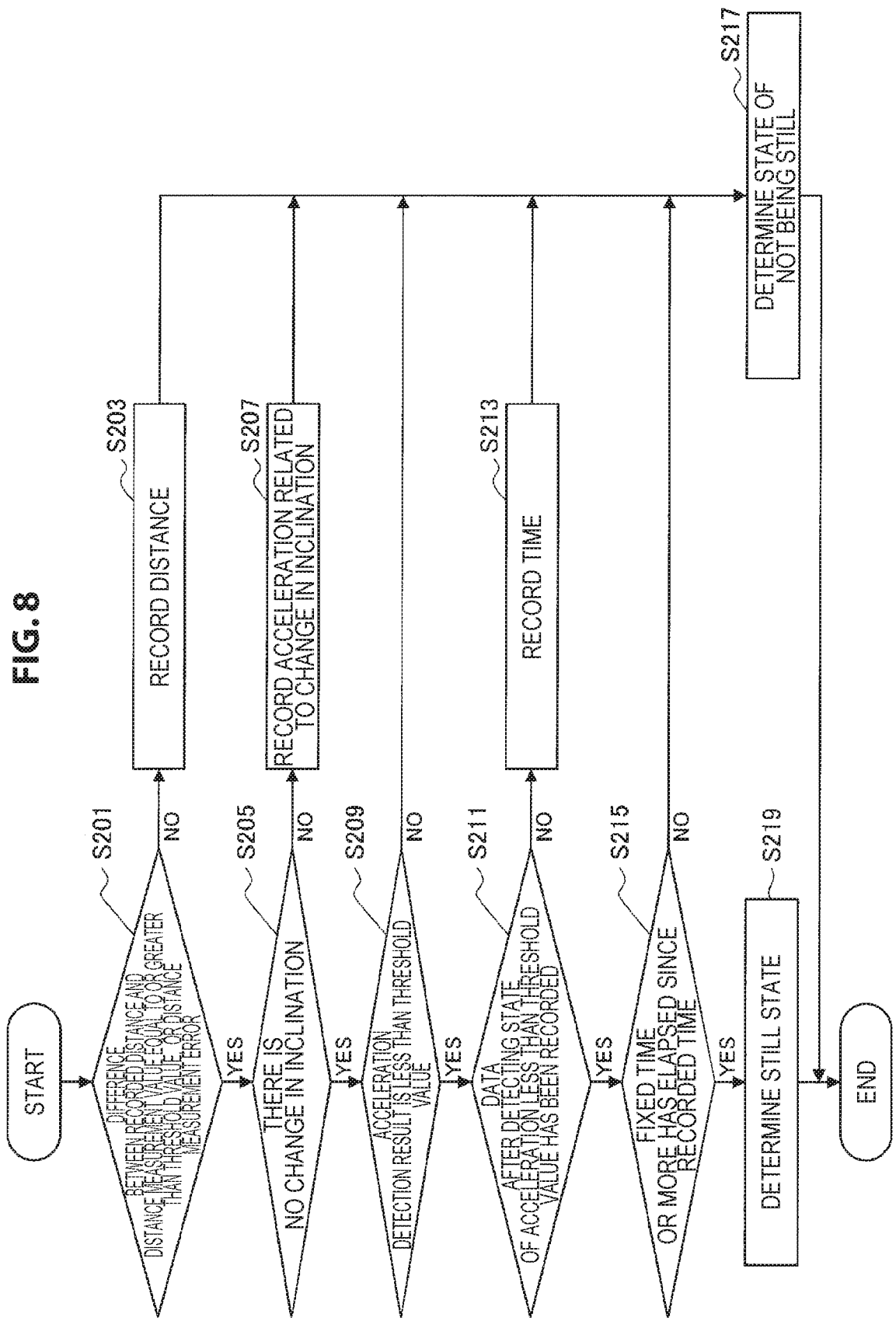
FIG. 8 is a flowchart illustrating an example of the flow of a state determination process by the information processing apparatus according to the embodiment.

Next, an example of the flow of the state determination process labeled with the reference sign S200 in FIG. 6 will be described. First, FIG. 8 will be referenced to describe an example of a process in which, assuming a case in which the information processing apparatus 10 has limited the amount of illuminating light L1 from the illumination unit 111, to switch the illumination unit 111 back to the turned-on state, it is determined whether or not the information processing apparatus 10 is in the still state. FIG. 8 is a flowchart illustrating an example of the flow of a process of the information processing apparatus 10 according to the present embodiment. Note that, as described earlier with reference to FIGS. 5 and 6, the process illustrated in FIG. 8 is executed successively (for example, at intervals of a designated timing) by the information processing apparatus 10, and an update of various states is conducted in accordance with the execution of the process.

(Steps S201, S203, S217)

First, the information processing apparatus 10 determines whether or not the amount of change in the distance R11 is equal to or greater than a threshold value, on the basis of the measurement result regarding the distance R11 between the projection unit 11 and the projection plane 90. Specifically, the information processing apparatus 10 compares a measurement result regarding the distance R11 previously recorded as data in a designated storage area (that is, a past measurement result) and a newly acquired measurement result regarding the distance R11, and determines whether or not the difference is equal to or greater than a threshold value (S201). In the case in which the difference between the previously recorded measurement result regarding the distance R11 and the newly acquired measurement result regarding the distance R11 is less than the threshold value (S201, NO), the information processing apparatus 10 records the newly acquired measurement result regarding the distance R11 in a designated storage area (a storage area readable by the information processing apparatus 10) as data (S203). Note that at this point in time, the information processing apparatus 10 determines a state in which itself is not still (in other words, a state in which the amount of illuminating light L1 is limited) (S217).

In addition, in the case of conducting the determination according to step S201 for the first time, corresponding data, that is, a previous measurement result regarding the distance R11, is not recorded in the designated storage area. Even in such a case, the information processing apparatus 10 may record the acquired measurement result regarding the distance R11 in the designated storage area as data (S203), and determine a state in which itself is not still (S217).

(Steps S205, S207, S217)

Also, in the case in which the difference between the previously recorded measurement result regarding the distance R11 and the newly acquired measurement result regarding the distance R11 is equal to or greater than the threshold value, or the measurement of the distance R11 fails (S201, YES), the information processing apparatus 10 confirms the presence or absence of a change in the inclination of itself on the basis of a detection result regarding an acceleration for determining a change in the inclination (S205). Note that an example of a process by which the information processing apparatus 10 detects a change in the inclination of itself will be separately described later.

In the case of determining that there is a change in the inclination of itself (S205, NO), the information processing apparatus 10 records a detection result regarding the acquired acceleration (that is, an acceleration regarding the change in inclination) in a designated storage area as data (S207). Note that at this point in time, the information processing apparatus 10 determines a state in which itself is not still (S217).

(Steps S209, S217)

Additionally, in the case of determining that there is no change in the inclination of itself (S205, YES), the information processing apparatus 10 determines whether or not a detection result regarding an acceleration imparted to itself is less than a threshold value (S209).

As a more specific example, the information processing apparatus 10 may compute a first acceleration obtained by subtracting the effects of gravitational acceleration 1G from a three-dimensional scalar quantity of acceleration on the basis of a detection result regarding accelerations acquired for each of three axes (x-axis, y-axis, and z-axis), and treat the first acceleration as the target of the determination. Note that the three-dimensional scalar quantity of acceleration is computable, for example, by taking the square root of the sum of squares of the accelerations corresponding to each of the three axes. Note that the first acceleration computed at this time corresponds to the AC component among all components of force imparted to the information processing apparatus 10.

Figure 9:
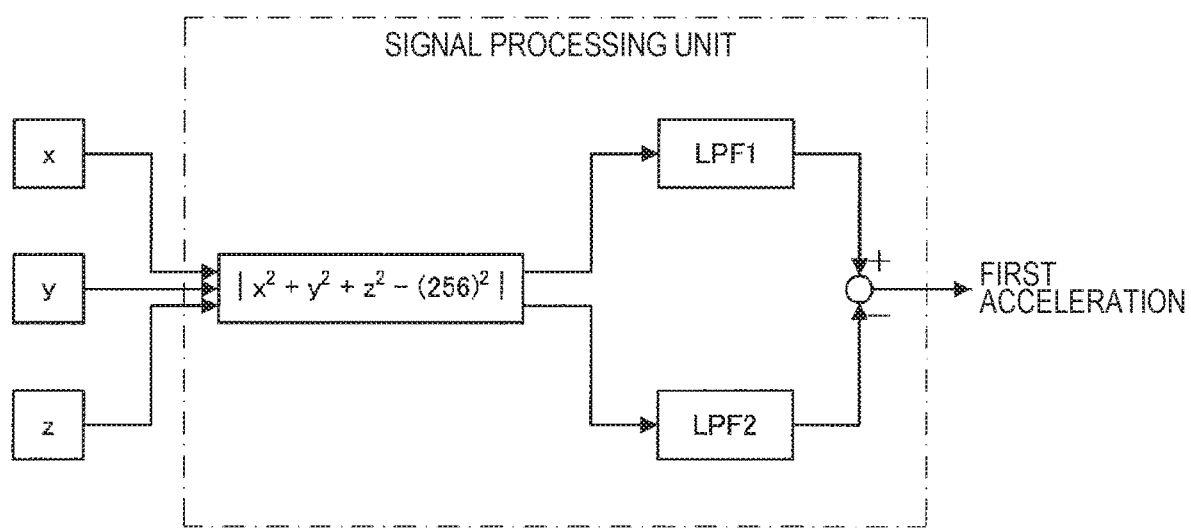
FIG. 9 is a diagram for explaining an example of a configuration of a signal processing unit for outputting a first acceleration.

For example, FIG. 9 illustrates an example of the configuration of a signal processing unit for outputting the first acceleration on the basis of a detection result regarding accelerations acquired for each of three axes (x-axis, y-axis, and z-axis). Note that in the example illustrated in FIG. 9, it is assumed that the accelerations are acquired in units of 1/256G, and the gravitational acceleration 1G=256. Specifically, the signal processing unit illustrated in FIG. 9 applies low-pass filters LPF1 and LPF2 to the absolute value of the difference between the sum of squares of the accelerations corresponding to each of the three axes, and the square of the gravitational acceleration, and outputs the difference (that is, the AC component) of the signals output from each of the low-pass filters as the first acceleration.

On the other hand, the first acceleration tends to be easily susceptible to the influence of gravitational acceleration. For this reason, the information processing apparatus 10 may also compute an acceleration component from which the influence of gravitational acceleration has been removed (hereinafter called the "second acceleration" in some cases), and treat the second acceleration as the target of the determination.

Figure 10:
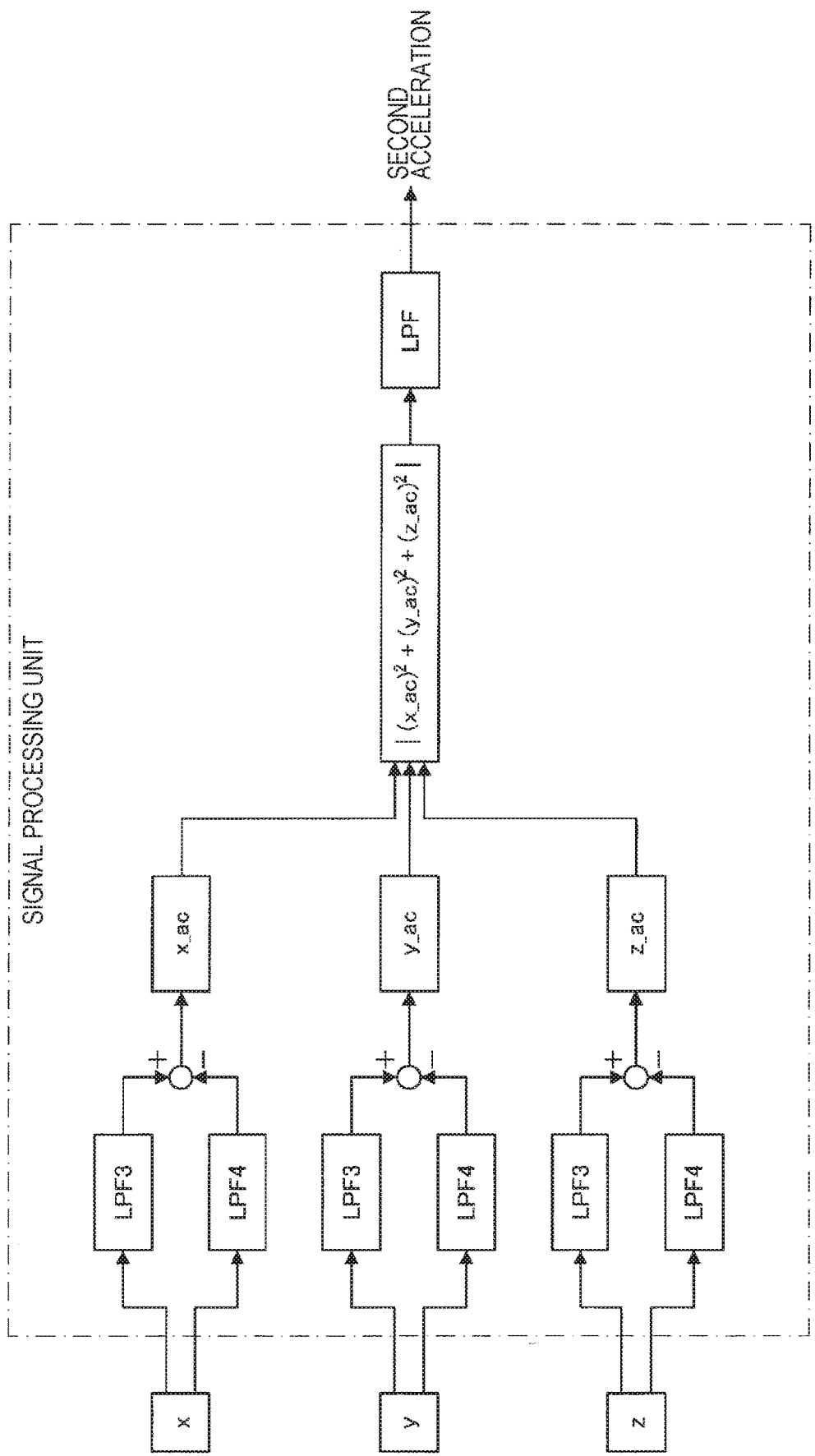
FIG. 10 is a diagram for explaining an example of a configuration of a signal processing unit for outputting a second acceleration.

For example, FIG. 10 illustrates an example of the configuration of a signal processing unit for outputting the second acceleration on the basis of a detection result regarding accelerations acquired for each of three axes (x-axis, y-axis, and z-axis). Specifically, the signal processing unit illustrated in FIG. 10 applies low-pass filters LPF3 and LPF4 to the accelerations corresponding to each of the three axes, and finds the difference between signals output from each of the low-pass filters. By such a process, AC components x_ac, y_ac, and z_ac are extracted from the detection result regarding accelerations acquired for each of the three axes (x-axis, y-axis, and z-axis). Subsequently, the signal processing unit computes the absolute value of the sum of squares of the extracted AC components x_ac, y_ac, and z_ac of the accelerations for each of the three axes, and after applying a low-pass filter LPF to the computed result, outputs the output of the low-pass filter LPF as the second acceleration.

By treating the second acceleration computed as above as the target of the determination, the information processing apparatus 10 becomes able to remove the influence of gravitational acceleration, and detect tinier accelerations. Herein, the information processing apparatus 10 may treat only one of the first acceleration and the second acceleration as the target of the determination, or treat both as targets of the determination. Note that in the following description, it is assumed that the information processing apparatus 10 treats both of the first acceleration and the second acceleration as targets of the determination, and determines whether or not each of the first acceleration and the second acceleration is less than a corresponding threshold value.

Note that the threshold value used in the determination with respect to each of the first acceleration and the second acceleration corresponds to an example of a standard for determining whether or not the information processing apparatus 10 is in the still state (in other words, whether or not to switch the illumination unit 111 back to the turned-on state), and may be decided on the basis of results of prior experiment or the like. As a more specific example, the threshold value used in the determination with respect to the first acceleration may be set to an acceleration corresponding to approximately 1.95G. Also, the threshold value used in the determination with respect to the second acceleration may be set to an acceleration corresponding to approximately 0.78G.

In the case in which at least one of the first acceleration and the second acceleration is equal to or greater than the threshold value (S209, NO), the information processing apparatus 10 determines that, at this point in time, the information processing apparatus 10 is in a state in which itself is not still (S217).

(Steps S211, S213, S217)

Also, in the case in which both of the first acceleration and the second acceleration are less than the threshold values (S209, YES), the information processing apparatus 10 confirms whether or not data corresponding to a state after detecting that the accelerations (that is, both of the first acceleration and the second acceleration) have become less than the threshold values is recorded in a designated storage area (S211). Note that the data includes information indicating the time when detection results regarding the accelerations were detected to have become less than the threshold values, for example. Herein, in the case in which the determination is conducted for the first time after detecting that the detection results regarding the accelerations have become less than the threshold values, corresponding data is not recorded. For this reason, in the case in which corresponding data is not recorded in the designated storage area (S211, NO), the information processing apparatus 10 records information indicating the time when the detection results regarding the accelerations were detected to have become less than the threshold values in the designated storage area as data (S213). Note that at this point in time, the information processing apparatus 10 determines a state in which itself is not still (S217).

(Steps S215, S219)

Also, in the case in which corresponding data is already recorded in the designated storage area (S211, YES), the information processing apparatus 10 determines whether or not a designated period has elapsed since the time recorded as the data (that is, the time when the detection results regarding the accelerations became less than the threshold values) (S215). In the case in which the designated period has elapsed since the time recorded as data (S215, YES), the information processing apparatus 10 determines the state of itself as the still state (S219). Note that the designated period in this determination may be set to approximately 1000 msec, for example.

(Steps S215, S217)

Note that in the case in which the designated period has not elapsed since the time recorded as data (S215, NO), the information processing apparatus 10 determines that, at this point in time, the information processing apparatus 10 is in a state in which itself is not still (S217). In this case, the state in which the detection results regarding the accelerations are less than the threshold values continues thereafter, and the information processing apparatus 10 determines the state of itself as the still state after the designated period elapses.

Note that in this process, even in the case of determining that the information processing apparatus 10 is not still, in some cases the information processing apparatus 10 may be determined to be in the still state in a process for determining whether or not the information processing apparatus 10 has started moving, to be described later. In the example illustrated in FIG. 4, for example, this corresponds to the case in which the acceleration is "medium", and the change in the distance R11 between the projection unit 11 and the projection plane 90 is determined to be "small". Note that details will be separately described later.

The above describes an example of a process for determining whether or not the information processing apparatus 10 is in the still state with reference to FIG. 8.

Figure 11:
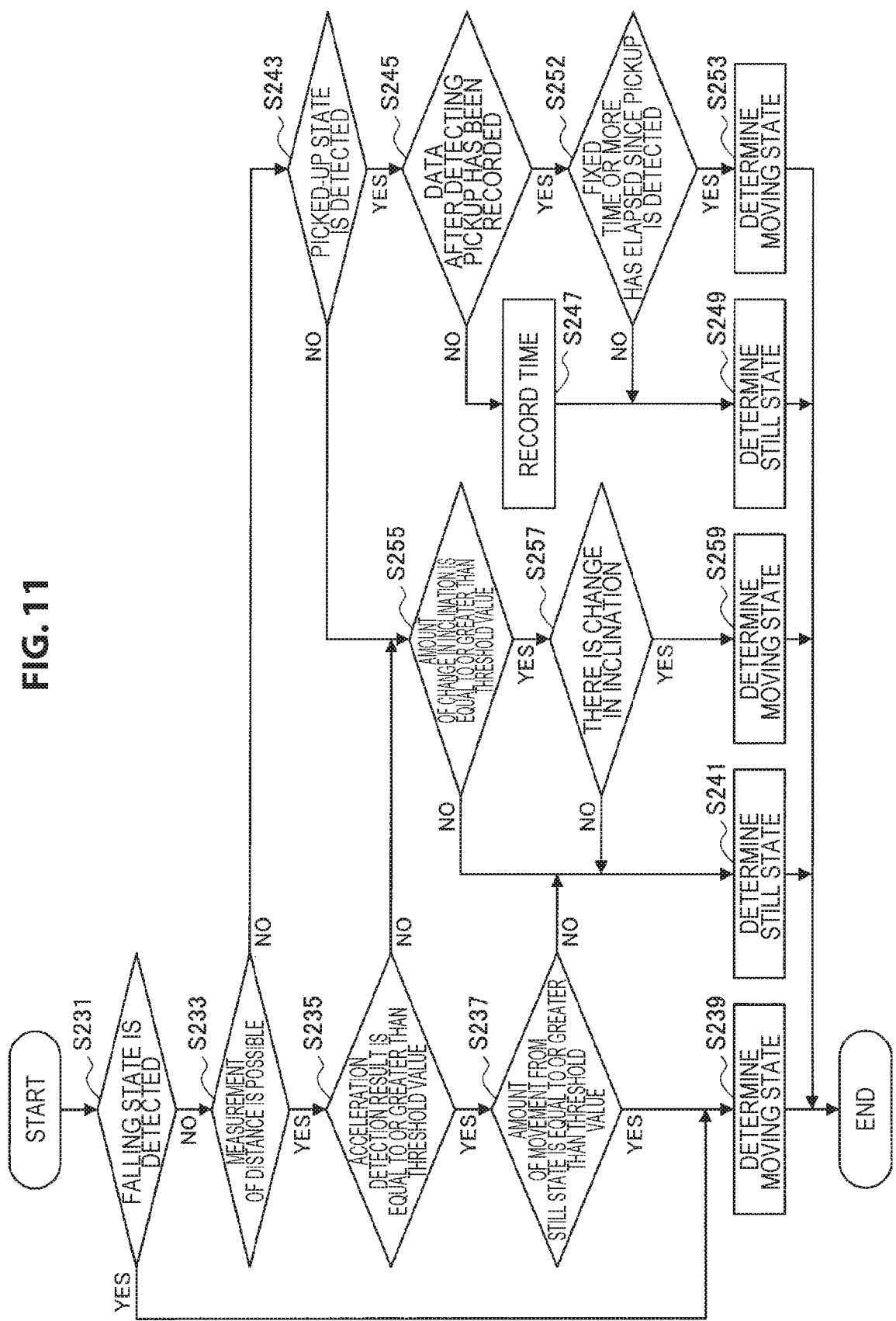
FIG. 11 is a flowchart illustrating an example of the flow of a state determination process by the information processing apparatus according to the embodiment.

Next, an example of a process for determining whether or not the information processing apparatus 10 has started moving will be described with reference to FIG. 11. FIG. 11 is a flowchart illustrating an example of the flow of a process by the information processing apparatus 10 according to the present embodiment, and illustrates an example of the flow of a process for determining whether or not the information processing apparatus 10 has started moving. Note that the process illustrated in FIG. 11 is executed next after the process described above with reference to FIG. 8. Also, as described earlier with reference to FIGS. 5 and 6, the process illustrated in FIG. 11 is executed successively (for example, at intervals of a designated timing) by the information processing apparatus 10, and an update of various states is conducted in accordance with the execution of the process.

(Steps S231, S239)

First, the information processing apparatus 10 determines whether or not itself is in a falling state, on the basis of a detection result regarding the acceleration imparted to itself (S231). Note that an example of a process for determining whether or not the information processing apparatus 10 is in the falling state will be separately described later. In the case of determining that itself is in the falling state (S231, YES), the information processing apparatus 10 determines that itself is in the moving state (S239).

(Steps S233, S235, S237, S239)

Also, in the case of determining that itself is not in the falling state (S231, NO), the information processing apparatus 10 determines whether or not the distance R11 between the projection unit 11 and the projection plane is measurable (S233). At this time, the information processing apparatus 10 additionally may determine whether or not an opening through which the projection unit 11 projects a video is closed. Note that in this case, in a state in which the opening is closed, it is sufficient for the information processing apparatus 10 to determine that measurement of the distance R11 is unavailable.

In the case of determining that the distance R11 is measurable (S233, YES), the information processing apparatus 10 determines whether or not the detection result regarding the acceleration imparted to itself is equal to or greater than a threshold value (S235). At this time, the information processing apparatus 10 may determine whether or not the first acceleration described above is equal to or greater than a threshold value, for example. Note that the threshold value used in the determination corresponds to an example of a threshold value for determining whether or not the information processing apparatus 10 is in the still state. More specifically, in the case of treating the first acceleration as the target of determination, for example, the threshold value of the determination may be set to an acceleration corresponding to approximately 1.95G.

In the case of determining that the detection result regarding the acceleration is equal to or greater than the threshold value (S235, YES), the information processing apparatus 10 determines whether or not the amount of movement after determining that the information processing apparatus 10 was in the still state (in other words, the amount of change in the distance R11 between the projection unit 11 and the projection plane 90) is equal to or greater than a threshold value (S237). In the case of determining that the amount of movement after determining the still state is equal to or greater than the threshold value (S237, YES), the information processing apparatus 10 determines that itself is in the moving state (S239). Note that the threshold value of the amount of movement may be decided in advance, in accordance with the anticipated usage pattern of the information processing apparatus 10. Specifically, it is desirable to decide the threshold value on the basis of a range of distance over which the information processing apparatus 10 is anticipated to be moved when adjusting the projection position and size of the video. As a more specific example, the threshold value may be set to correspond to approximately 10 mm.

(Steps S237, S241)

On the other hand, in the determination according to step S237, in the case in which the information processing apparatus 10 determines that the amount of movement after determining the still state is less than the threshold value (S237, NO), the information processing apparatus 10 determines that itself is in the still state (S241).

(Steps S235, S255, S241)

Next, the description will focus on operations in the case in which, in the determination of step S235, the information processing apparatus 10 determines that the detection result regarding the acceleration is less than the threshold value (S235, NO). First, the information processing apparatus 10 detects the amount of change in the inclination of itself (or the projection unit 11) with respect to a standard attitude, and determines whether or not the amount of change in the inclination is equal to or greater than a threshold value (for example, whether the amount of change in the inclination is "large" or "small") (S255). Note that an example of a process by which the information processing apparatus 10 detects the amount of change in the inclination of itself will be separately described later. In the case of determining that the amount of change in the inclination of itself is less than the threshold value (in other words, in the case in which the amount of change in the inclination is "small") (S255, NO), the information processing apparatus 10 determines that itself is in the still state (S241).

(Steps S255, S257, S259)

Also, in the case of determining that the amount of change in the inclination of itself is equal to or greater than the threshold value (in other words, in the case in which the amount of change in the inclination is "large") (S255, NO), the information processing apparatus 10 determines whether or not the inclination (attitude) of itself is changing over time (S257). Note that an example of a process by which the information processing apparatus 10 determines the presence or absence of change in the inclination of itself (that is, change in the inclination over time) will be separately described later. In the case of detecting change in the inclination of itself (change in the inclination over time) (S257, YES), the information processing apparatus 10 determines that itself is in the moving state (S259).

(Steps S257, S241)

On the other hand, in the case of determining that the inclination of itself is not changing over time (S257, NO), the information processing apparatus 10 determines that itself is in the still state (S241).

(Steps S233, S243)

Next, the description will focus on operations in the case in which, in the determination of step S233, the information processing apparatus 10 determines that measurement of the distance R11 is unavailable (S233, NO). First, the information processing apparatus 10 determines whether or not itself is in a state of being picked up by the user, for example (S243). Note that an example of a process by which the information processing apparatus 10 determines whether or not itself is in the picked-up state will be separately described later. Herein, in the case of determining that itself is not in the picked-up state (S243, NO), the information processing apparatus 10 proceeds to the process according to step S255 described above (that is, the process related to the determination of the amount of change in the inclination). Note that since the flow of processes in step S255 and thereafter is as described above, detailed description will be omitted.

(Steps S245, S247, S249)

In the case of determining that itself is in the picked-up state (S243, YES), the information processing apparatus 10 confirms whether or not data corresponding a state after detecting that itself has been picked up is recorded in a designated storage area (S245). Note that the data includes information indicating the time of detecting that the information processing apparatus 10 was picked up, for example. Herein, in the case in which the determination is conducted for the first time after detecting that the information processing apparatus 10 has been picked up, corresponding data is not recorded. For this reason, in the case in which corresponding data is not recorded in the designated storage area (S245, NO), the information processing apparatus 10 records information indicating the time of detecting that itself was picked up in the designated storage area as data (S247). Note that at this point in time, the information processing apparatus 10 determines that itself is in the still state (S249).

(Steps S245, S252, S252)

Also, in the case in which corresponding data is already recorded in the designated storage area (S245, YES), the information processing apparatus 10 determines whether or not a designated period has elapsed since the time recorded as the data (that is, the time of detecting that itself was picked up) (S252). In the case in which the designated period has elapsed since the time recorded as data (S252, YES), the information processing apparatus 10 determines that itself is in the moving state (S252). Note that the designated period in this determination may be set to approximately 300 msec, for example.

(Steps S252, S249)

Note that in the case in which the designated period has not elapsed since the time recorded as data (S252, NO), the information processing apparatus 10 determines that, at this point in time, itself is in the still state (S249). In this case, the state in which itself has been picked up continues thereafter, and the information processing apparatus 10 determines the state of itself as the moving state after the designated period elapses.

The above describes an example of a process for determining whether or not the information processing apparatus 10 has started moving with reference to FIG. 11.

[Process of Detecting Change in Inclination]

Figure 12:
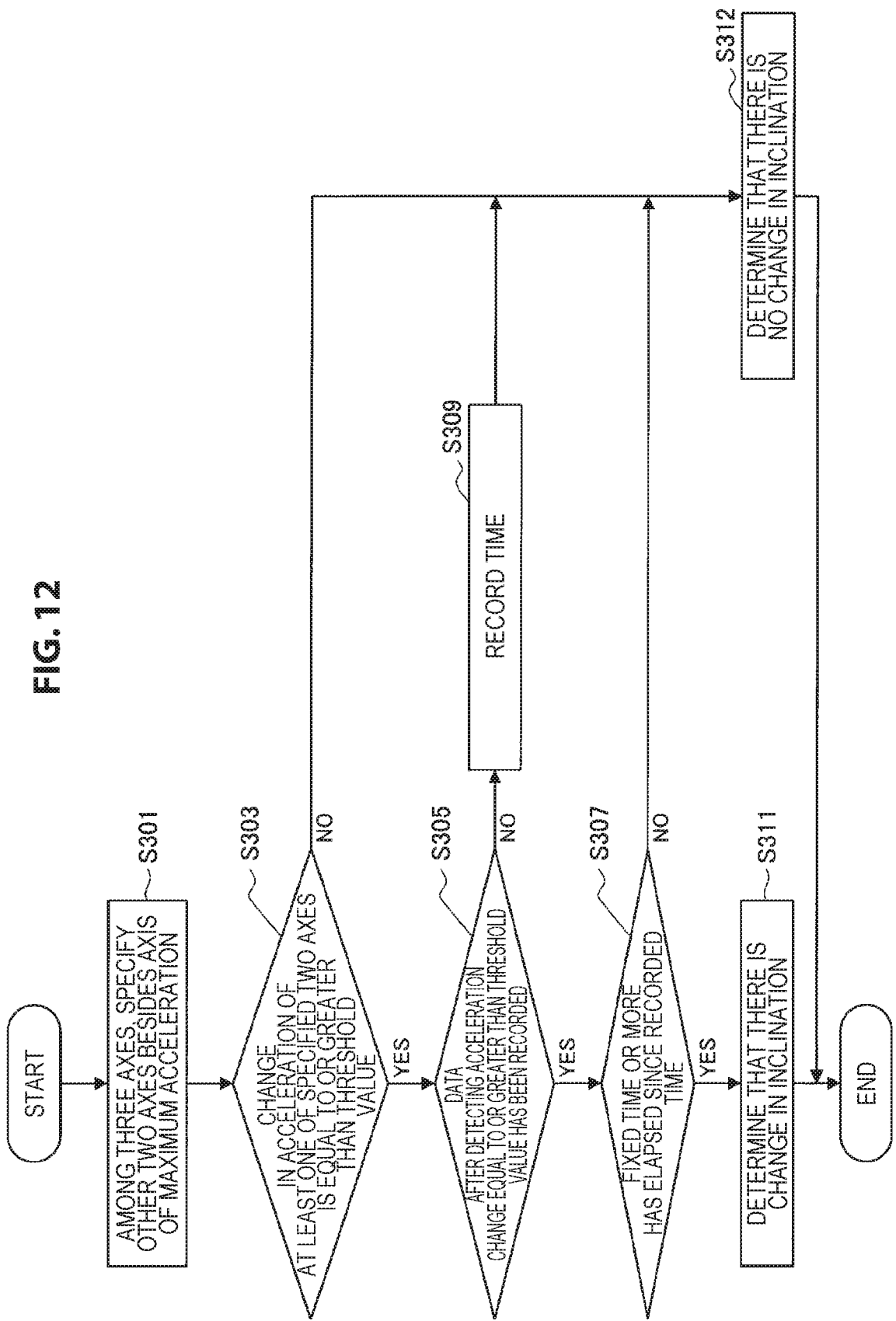
FIG. 12 is a flowchart illustrating an example of the flow of a process for detecting a change in an inclination of the information processing apparatus according to the embodiment.

Next, an example of a process by which the information processing apparatus 10 detects change (that is, change over time) in the inclination (attitude) of itself (or the projection unit 11) will be described with reference to FIG. 12. FIG. 12 is a flowchart illustrating an example of the flow of a process by the information processing apparatus 10 according to the present embodiment, and illustrates an example of a process by which the information processing apparatus 10 detects change in the inclination of itself. Note that, as described earlier with reference to FIGS. 5 and 6, the process illustrated in FIG. 12 is executed successively (for example, at intervals of a designated timing) by the information processing apparatus 10, and an update of various states is conducted in accordance with the execution of the process.

(Step S301)

First, the information processing apparatus 10 compares the acceleration acquired for each of the three axes (x-axis, y-axis, and z-axis), and specifies the other two axes other than the axis on which the corresponding acceleration is the maximum among the three axes. For example, in the case in which the information processing apparatus 10 is arranged to project a video in the horizontal direction as illustrated in FIG. 1, and the information processing apparatus 10 is in the still state, only an acceleration of 1G pointing in the −z-axis direction (that is, the gravitational acceleration) is detected (that is, the accelerations in the x-axis direction and the y-axis direction are 0G). In such a case, the information processing apparatus 10 specifies the x-axis and the y-axis as the other two axes other than the z direction.

(Steps S303, S313)

Next, the information processing apparatus 10 specifies whether or not the change in the acceleration of at least one of the specified two axes is equal to or greater than a threshold value. Note that, regarding the threshold value at this time, an angle at which to determine that the information processing apparatus 10 is inclined may be decided in advance, and the threshold value at this time may be decided on the basis of the maximum value detected as a change in the acceleration of at least one of the specified two axes when the information processing apparatus 10 actually becomes inclined by the angle, for example. As a more specific example, in the case of detecting an inclination exceeding approximately 5 degrees in any direction, the threshold value used in the determination of a change in acceleration may be set to an acceleration corresponding to approximately 0.08G. Note that in the case in which the change in the acceleration is less than the threshold value for both of the specified two axes (S303, NO), the information processing apparatus 10 determines that there is no change in inclination (S303).

(Steps S305, S309, S313)

On the other hand, in the case in which the change in the acceleration of at least one of the specified two axes is equal to or greater than the threshold value (S303, YES), the information processing apparatus 10 confirms whether or not data corresponding to a state after detecting that the change in the acceleration has become equal to or greater than the threshold value is recorded in a designated storage area (S305). Note that the data includes information indicating the time when the change in acceleration became equal to or greater than the threshold value (that is, the time when a change in inclination was detected), for example. Herein, in the case in which the determination is conducted for the first time after detecting that a change in acceleration has become equal to or greater than the threshold value, corresponding data is not recorded. For this reason, in the case in which corresponding data is not recorded in the designated storage area (S305, NO), the information processing apparatus 10 records information indicating the time when the change in acceleration was detected to have become equal to or greater than the threshold value in the designated storage area as data (S309). Additionally, in this case, the information processing apparatus 10 determines that there is no change in inclination (S303).

(Steps S307, S311)

Also, in the case in which corresponding data is already recorded in the designated storage area (S305, YES), the information processing apparatus 10 determines whether or not a designated period has elapsed since the time recorded as the data (that is, the time when the change in acceleration became equal to or greater than the threshold value) (S307). In the case in which the designated period has elapsed since the time recorded as data (S307, YES), the information processing apparatus 10 determines that there is a change in inclination (S311). Note that the designated period in this determination may be set to approximately 200 msec, for example.

(Steps S307, S303)

Note that in the case in which the designated period has not elapsed since the time recorded as data (S307, NO), the information processing apparatus 10 determines that, at this point in time, there is no change in inclination (S303). In this case, the state in which the change in inclination has become equal to or greater than the threshold value continues thereafter, and the information processing apparatus 10 determines that there is a change in inclination after the designated period elapses.

The above describes an example of a process by which the information processing apparatus 10 detects an inclination (that is, a change in attitude) of itself (or the projection unit 11) with reference to FIG. 12.

[Process of Detecting Amount of Change in Inclination]

Figure 13:
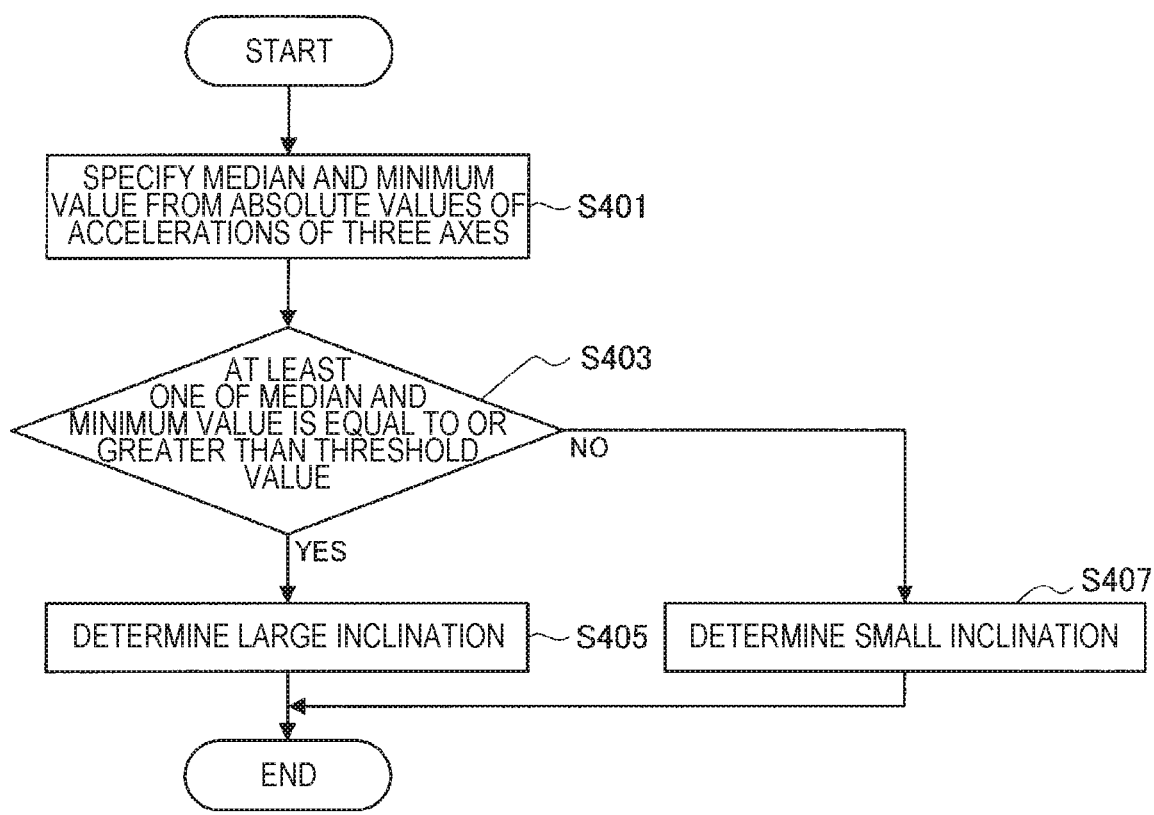
FIG. 13 is a flowchart illustrating an example of the flow of a process for detecting an amount of change in the inclination of the information processing apparatus according to the embodiment.

Next, an example of a process by which the information processing apparatus 10 detects an amount of change in inclination (that is, an amount of change in attitude) of itself (or the projection unit 11) will be described with reference to FIG. 13. FIG. 13 is a flowchart illustrating an example of the flow of a process by the information processing apparatus 10 according to the present embodiment, and illustrates an example of a process by which the information processing apparatus 10 detects an amount of change in the inclination of itself with respect to a standard attitude. Note that the standard attitude may be, for example, the attitude of the information processing apparatus 10 in a state in which the projection unit 11 is facing straight towards the projection plane 90 extending in an approximately vertical direction (in other words, a state in which the projection unit 11 projects a video in the horizontal direction), as illustrated in FIG. 1. Also, as described earlier with reference to FIGS. 5 and 6, the process illustrated in FIG. 13 is executed successively (for example, at intervals of a designated timing) by the information processing apparatus 10, and an update of various states is conducted in accordance with the execution of the process.

(Step S401)

First, the information processing apparatus 10 computes the absolute value of the acceleration acquired for each of the three axes (x-axis, y-axis, and z-axis), and from among the absolute values of the acceleration for each of the three axes, extracts the median and the minimum value. Note that the median and the minimum value correspond to the accelerations acquired for the two axes less influenced by gravitational acceleration. For example, in the case in which the z-axis direction corresponds to the vertical direction, the z-axis direction receives the most influence from gravitational acceleration. For this reason, in this case, the absolute values of the accelerations acquired for the x-axis and the y-axis correspond to the median and the minimum value.

(Step S403)

Next, the information processing apparatus 10 determines whether or not at least one of the extracted median and minimum value is equal to or greater than a threshold value, and in accordance with the determination result, determines whether the change in the inclination of itself is "large" or "small". Herein, the state in which the change in inclination is "large" indicates a state in which, in relation to a change in inclination (in other words, a change in attitude) of the information processing apparatus 10, the attitude of the information processing apparatus 10 has inclined by a designated angle or greater with respect to the standard attitude, for example. As a more specific example, the state in which the change in inclination is "large" corresponds to a state in which the attitude of the information processing apparatus 10 in inclined out of the adjustment range of a stand (such as a pan head, for example) that supports the information processing apparatus 10. Also, the state in which the change in inclination is "small" indicates a state in which the information processing apparatus 10 is not inclined, or a state in which the inclination of the information processing apparatus 10 with respect to the standard attitude is less than a designated angle. In other words, the state in which the change in inclination is "small" corresponds to a state in which the attitude of the information processing apparatus 10 is inclined within the adjustment range of the stand. As a more specific example, in the case of detecting that the attitude of the information processing apparatus 10 is inclined past approximately 9 degrees in any direction, the threshold value used in the determination with respect to the extracted median and minimum value may be set to an acceleration corresponding to approximately 0.16G.

(Step S405)

In the case in which at least one of the extracted median and minimum value is equal to or greater than the threshold value, the information processing apparatus 10 determines that the change in inclination is "large". This case corresponds to a state in which the attitude of the information processing apparatus 10 is inclined out of the adjustment range of the stand, for example, and thus may correspond to the case in which it is determined that the information processing apparatus 10 is not still.

(Step S407)

Also, in the case in which the extracted median and minimum value are both less than the threshold value, the information processing apparatus 10 determines that the change in inclination is "small". This case corresponds to a state in which the attitude of the information processing apparatus 10 is inclined within the adjustment range of the stand, for example, and thus may correspond to the case in which it is determined that the information processing apparatus 10 is still.

Note that in the example described above, a case of detecting the amount of change in the inclination of the information processing apparatus 10 by treating the case in which the information processing apparatus 10 is in the state of a designated attitude as a standard attitude is described as an example, but the configuration is not necessarily limited to the same aspect. As a specific example, the standard attitude may also be set dynamically. More specifically, in the case in which the still state is ongoing for a fixed period or more, the information processing apparatus 10 may set the attitude of itself at the time as the standard attitude.

The above describes an example of a process by which the information processing apparatus 10 detects an amount of change in inclination (that is, an amount of change in attitude) of itself (or the projection unit 11) with reference to FIG. 13.

[Fall Detection Process]

Figure 14:
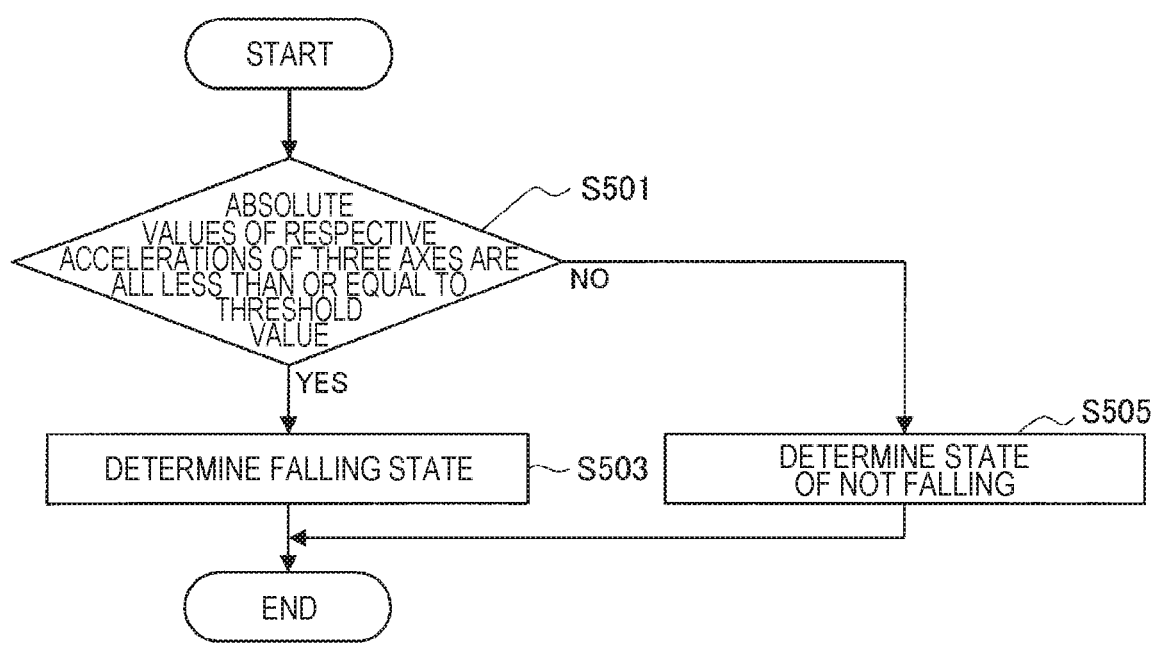
FIG. 14 is a flowchart illustrating an example of the flow of a drop detection process of the information processing apparatus according to the embodiment.

Next, an example of a process for determining whether or not the information processing apparatus 10 is in the falling state will be described with reference to FIG. 14. FIG. 14 is a flowchart illustrating an example of the flow of a process by the information processing apparatus 10 according to the present embodiment, and illustrates an example of the flow of a process for determining whether or not the information processing apparatus 10 is in the falling state. Note that, as described earlier with reference to FIGS. 5 and 6, the process illustrated in FIG. 14 is executed successively (for example, at intervals of a designated timing) by the information processing apparatus 10, and an update of various states is conducted in accordance with the execution of the process.

The information processing apparatus 10 determines whether or not itself is falling according to whether or not the accelerations acquired respectively for the three axes (x-axis, y-axis, and z-axis) are all less than or equal to a threshold value. Specifically, in the state in which an object (for example, the information processing apparatus 10 itself) is falling, acceleration pointing in the opposite direction of the gravitational acceleration is imparted to the object, and thus the acceleration and the gravitational acceleration cancel out each other. Additionally, in the state in which an object is in free fall, the acceleration imparted to the object ideally becomes 0G in all directions.

(Step S503)

On the basis of characteristics as described above, in the case of determining that the accelerations acquired for the three respective axes are all less than or equal to a threshold value (S501, YES), the information processing apparatus 10 determines falling. Note that, regarding the threshold value for the determination, an acceleration pointing in the vertical direction at which to determine that the information processing apparatus 10 is falling may be decided in advance, and the threshold value for the determination may be decided on the basis of the value detected as the acceleration for each of the three axis directions in the case in which the acceleration is imparted to the information processing apparatus 10. As a more specific example, the threshold value used in the determination with respect to the acceleration acquired for each of the three axes may be set to an acceleration corresponding to approximately 0.5G.

(Step S505)

Also, in the case of determining that at least one of the accelerations acquired for of the three respective axes exceeds the threshold value (S501, NO), the information processing apparatus 10 determines a state of not falling.

The above describes an example of a process for determining whether or not the information processing apparatus 10 is in the falling state with reference to FIG. 14.

[Pick-Up Detection Process]

Figure 15:
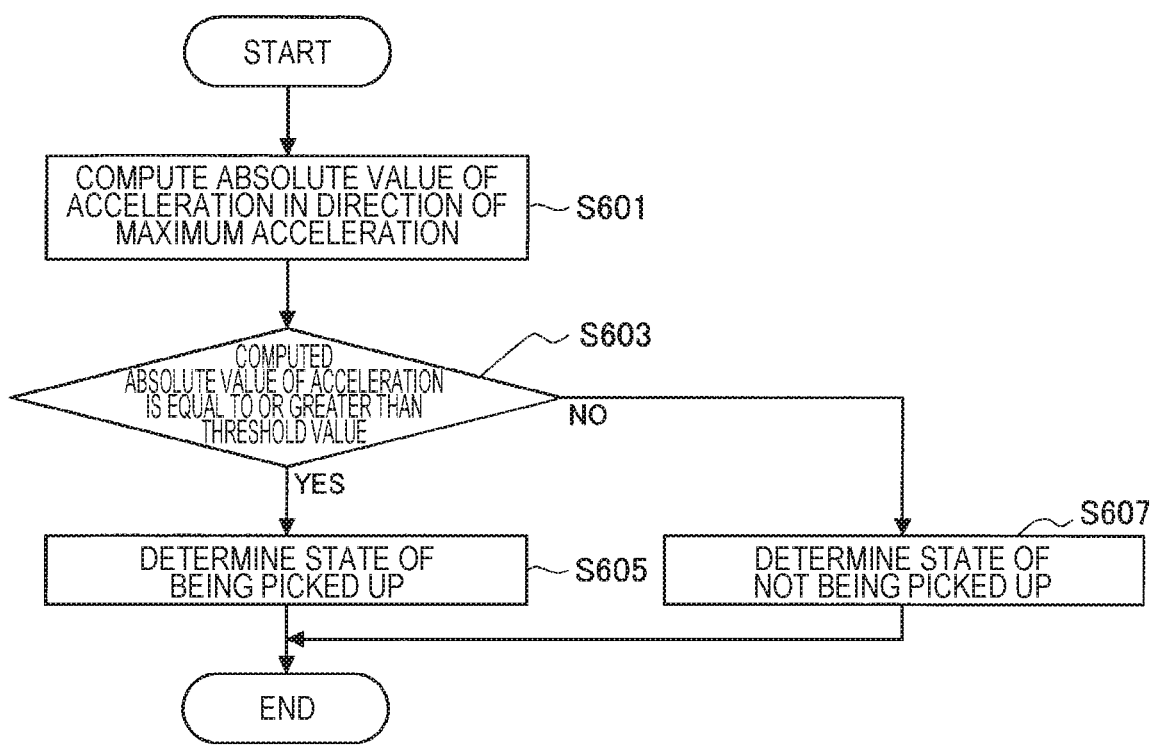
FIG. 15 is a flowchart illustrating an example of the flow of a process for determining whether or not the information processing apparatus according to the embodiment is in a picked-up state.

Next, an example of a process for determining whether or not the information processing apparatus 10 is in the picked-up state will be described with reference to FIG. 15. FIG. 15 is a flowchart illustrating an example of the flow of a process by the information processing apparatus 10 according to the present embodiment, and illustrates an example of the flow of a process for determining whether or not the information processing apparatus 10 is in the picked-up state. Note that, as described earlier with reference to FIGS. 5 and 6, the process illustrated in FIG. 15 is executed successively (for example, at intervals of a designated timing) by the information processing apparatus 10, and an update of various states is conducted in accordance with the execution of the process.

On the basis of a detection result regarding the acceleration for each of the three axes (x-axis, y-axis, and z-axis), the information processing apparatus 10 computes the absolute value of the acceleration in the direction in which the acceleration imparted to the information processing apparatus 10 reaches a maximum (hereinafter called the "absolute value of the maximum acceleration" in some cases). Specifically, in the case in which an acceleration pointing in the vertical direction (for example, the case of being picked up) is imparted to an object (for example, the information processing apparatus 10 itself), an acceleration pointing in a similar direction to the gravitational acceleration is additionally imparted to the object. For this reason, under such conditions, an acceleration greater than the gravitational acceleration (1G) pointing in the vertical direction based on absolute position is imparted to the information processing apparatus 10.

For this reason, the information processing apparatus 10 utilizes characteristics as described above to determine whether or not itself is being picked up, on the basis of whether or not an acceleration greater than 1G pointing in the vertical direction is imparted to itself (or the projection unit 11). More specifically, the information processing apparatus 10 determines whether or not itself is in the picked-up state, in accordance with whether or not the absolute value of the maximum acceleration is equal to or greater than a threshold value.

(Step S601)

Specifically, first, the information processing apparatus 10 extracts the maximum acceleration from among the accelerations acquired for the three respective axes (x-axis, y-axis, and z-axis), and computes the absolute value of the extracted acceleration as the absolute value of the maximum acceleration. In this case, for example, since gravitational acceleration is imparted to the axis corresponding to the vertical direction among the three axes, the absolute value of the acceleration acquired for the axis corresponding to the vertical direction becomes the absolute value of the maximum acceleration.

(Step S605)

Subsequently, in the case of determining that the computed absolute value of the maximum acceleration is equal to or greater than the threshold value, the information processing apparatus 10 determines that itself is in the picked-up state. Note that the threshold value of the determination may be decided in advance on the basis of the acceleration pointing in the vertical direction in the case of determining that the information processing apparatus 10 is in the picked-up state. As a more specific example, the information processing apparatus 10 may determine that itself is in the picked-up state in the case in which the absolute value of the acceleration in the direction of maximum acceleration imparted to the information processing apparatus 10 is equal to or greater than an acceleration corresponding to approximately 1.03G.

(Step S607)

Also, in the case of determining that the computed absolute value of the maximum acceleration is less than the threshold value, the information processing apparatus 10 determines that itself is not in the picked-up state.

Note that in the example described above, the determination targets the case in which the information processing apparatus 10 is placed so that one of the three axes (x-axis, y-axis, and z-axis) becomes an axis corresponding to the vertical direction. On the other hand, in the case in which the information processing apparatus 10 is placed in an inclined state, the accelerations detected on the three respective axes may be less than 1G in some cases. For this reason, to also anticipate the case in which the information processing apparatus 10 is placed in an inclined state, in the case of detecting pick-up of the information processing apparatus 10, a determination may be made on the basis of a ratio between an acceleration detected while the information processing apparatus 10 is in the placed state, and a newly detected acceleration.

Specifically, the information processing apparatus 10 records the absolute value of the maximum acceleration in a designated storage area, on the basis of a detection result regarding the accelerations acquired for the three respective axes (x-axis, y-axis, and z-axis) in the still state (for example, a state of being placed in an inclined state). Subsequently, in the case in which the absolute value of the maximum acceleration based on accelerations newly acquired for the three respective axes becomes equal to or greater than a designated multiple (for example, 1.03×) of the absolute value of the maximum acceleration recorded in the designated storage area (that is, the absolute value of the maximum acceleration in the still state), the information processing apparatus 10 may determine that itself is in the picked-up state.

The above describes an example of a process for determining whether or not the information processing apparatus 10 is in the picked-up state with reference to FIG. 15.

5. MODIFICATIONS

An example of the information processing apparatus 10 according to a modification of an embodiment of the present disclosure will be described.

Figure 16:
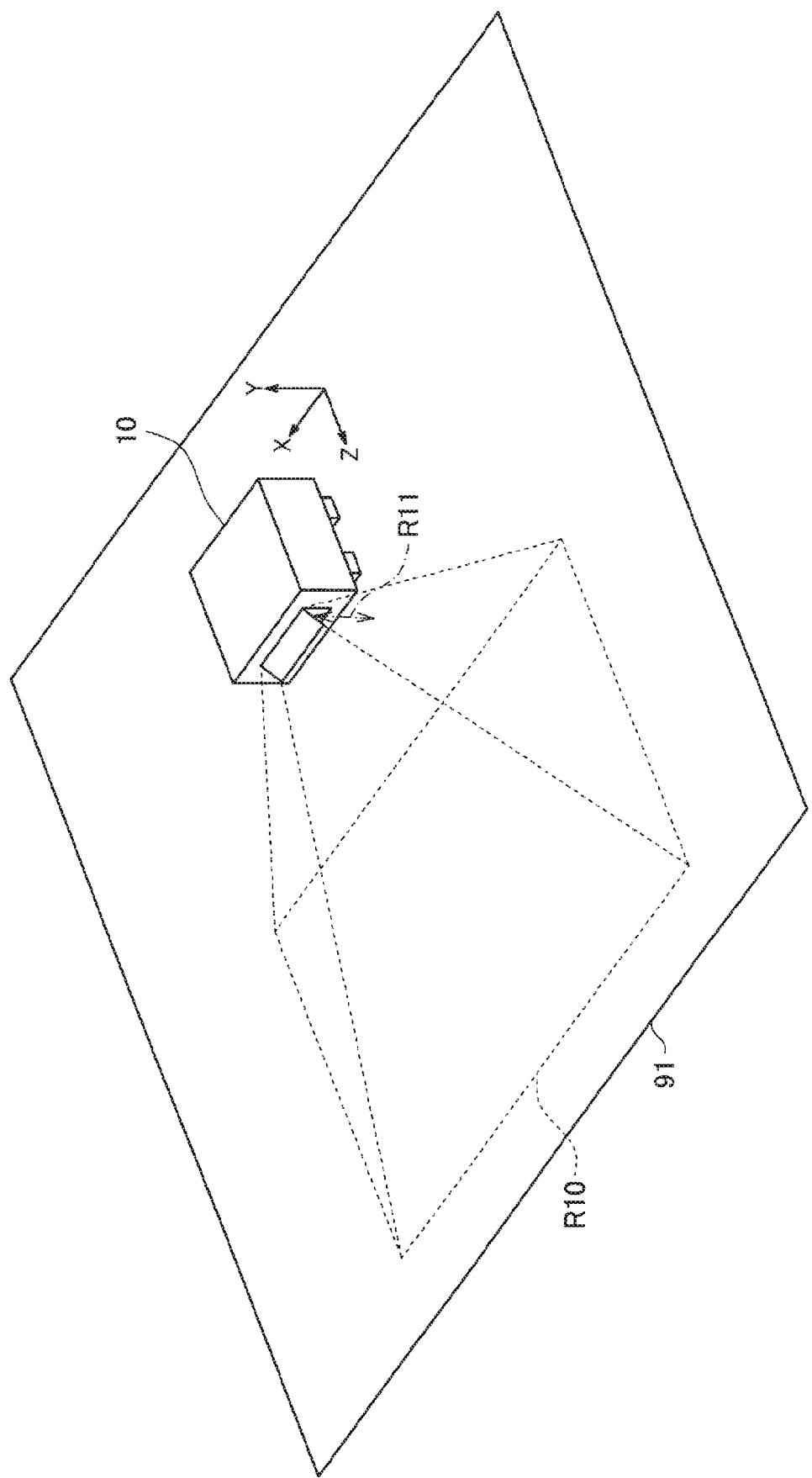
FIG. 16 is an explanatory diagram for explaining an example of a schematic configuration of an information processing apparatus according to Modification 1.

5.1. Modification 1: Example of Case of Treating Horizontal Plane as Projection Plane First, an example of the information processing apparatus 10 according to Modification 1 will be described with reference to FIG. 16. FIG. 16 is an explanatory diagram for explaining an example of a schematic configuration of the information processing apparatus 10 according to Modification 1.

The foregoing embodiment describes an example in which the information processing apparatus 10 presents display information to a user by treating a wall surface extending in an approximately vertical direction as the projection plane 90, and projecting the display information in an approximately horizontal direction onto the projection plane 90, as illustrated in FIG. 1. In contrast, in Modification 1, the information processing apparatus 10 is placed on a plane extending in an approximately horizontal direction, such as on a tabletop, in an attitude whereby the projection unit 11 faces in the direction of the plane. Additionally, the information processing apparatus 10 according to Modification 1 presents display information to a user by treating a plane extending in an approximately horizontal direction (for example, the plane on which itself is placed) as a projection plane 91, and projecting the display information in an approximately vertical direction onto the projection plane 91. Note that in the example illustrated in FIG. 16, the information processing apparatus 10 is placed in an attitude whereby, among the respective directions of the x-axis, y-axis, and z-axis relative to the information processing apparatus 10 (in other words, the three axis directions on which the information processing apparatus 10 detects accelerations imparted to itself), the x-axis direction and the z-axis direction correspond to the horizontal direction based on absolute position, while the y-axis direction corresponds to the vertical direction based on absolute position, for example.

As illustrated in FIG. 16, under conditions in which the information processing apparatus 10 is projecting a video onto the projection plane 91 extending in an approximately horizontal direction, the distance R11 between the projection unit 11 and the projection plane 91 becomes a designated distance. Also, under conditions like those illustrated in FIG. 16, the direction in which the projection unit 11 and the projection plane 91 are separated is approximately aligned with the vertical direction (that is, the direction in which the information processing apparatus 10 is picked up). For this reason, for example, in the case in which a user picks up the information processing apparatus 10 to move the information processing apparatus 10, the projection unit 11 and the projection plane 91 become separated, and the distance R11 changes.

For this reason, in the example illustrated in FIG. 16, in the case in which a measurement result regarding the distance R11 between the projection unit 11 and the projection plane 91 changes, for example, the information processing apparatus 10 may determine that the information processing apparatus 10 is in the picked-up state (that is, the moving state), and limit the amount of illuminating light L1 from the illumination unit 111. Also, as another example, in the case in which the measurement result regarding the distance R11 between the projection unit 11 and the projection plane 91 is approximately equal to a designated value, and an acceleration in the horizontal direction is detected (that is, in the case in which the position and orientation of the information processing apparatus 10 is being adjusted to move in the horizontal direction), the information processing apparatus 10 may determine a state in which the user is adjusting the display mode of the video (for example, the projection position of the video). In this case, the information processing apparatus 10 may maintain the turned-on state of the illumination unit 111, or restrain the amount of illuminating light L1 from the illumination unit 111 in a range in which the video projected onto the projection plane 91 can be distinguished.

In addition, the information processing apparatus 10 may also distinguish whether the attitude of itself is an attitude by which to project a video onto a wall surface as the projection plane 90 as illustrated in FIG. 1, or an attitude by which to project a video onto a plane such as a tabletop as the projection plane 91 as illustrated in FIG. 16, and switch various controls in accordance with the distinguishing result. Note that the method by which the information processing apparatus 10 recognizes the attitude of itself is not particularly limited. As a specific example, the information processing apparatus 10 may recognize the attitude of itself (in other words, a direction based on the absolute position in which the projection unit 11 is facing) by determining which direction from among the directions relative to itself (for example, the x-axis direction, y-axis direction, and z-axis direction) corresponds to the direction in which the gravitational acceleration (1G) is detected in the still state.

The above references FIG. 16 to describe, as an example of the information processing apparatus 10 according to Modification 1, an example of a case in which the information processing apparatus 10 is placed on a plane extending in an approximately horizontal direction, such as a tabletop, and projects a video by treating the plane as the projection plane 91.

Figure 17:
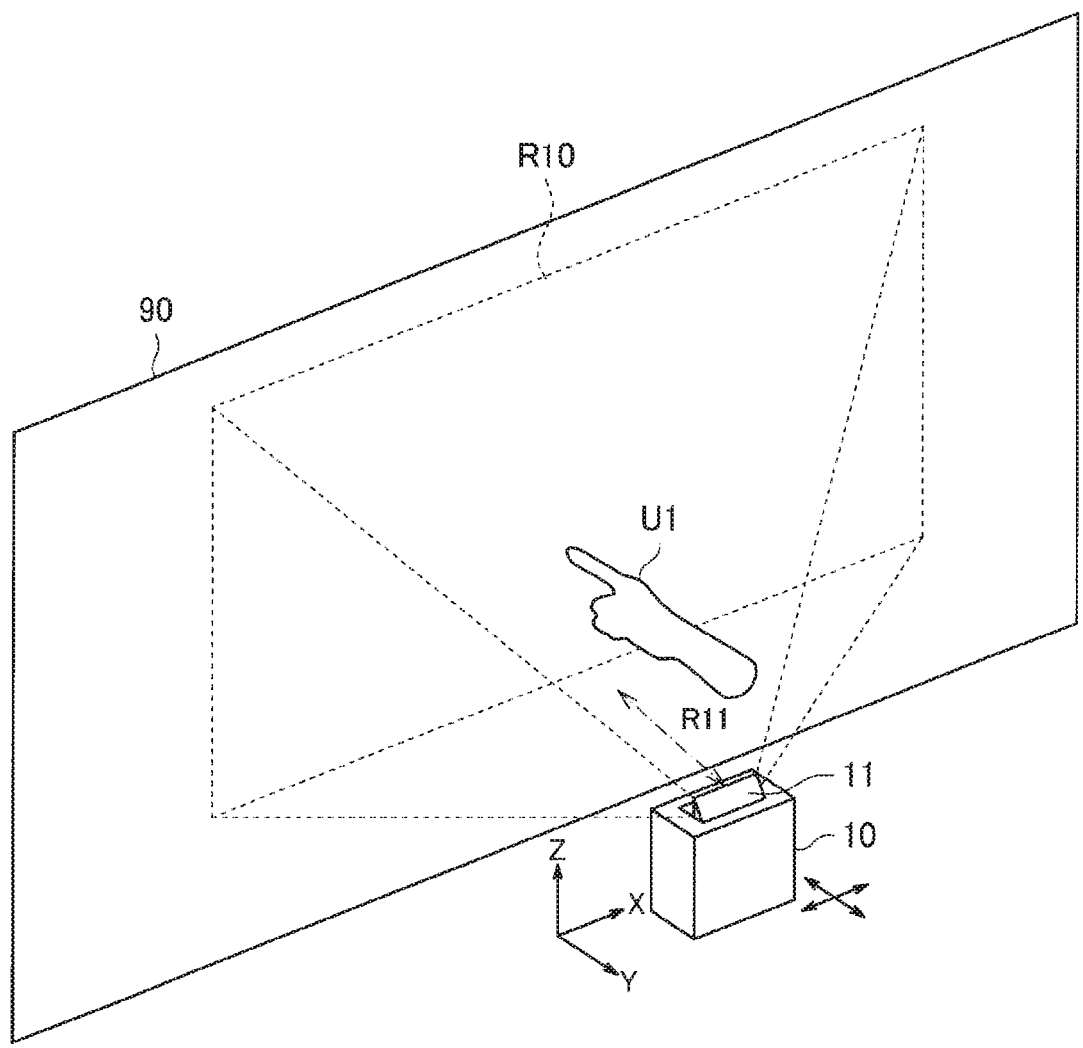
FIG. 17 is an explanatory diagram for explaining an example of a schematic configuration of an information processing apparatus according to Modification 2.
Figure 18:
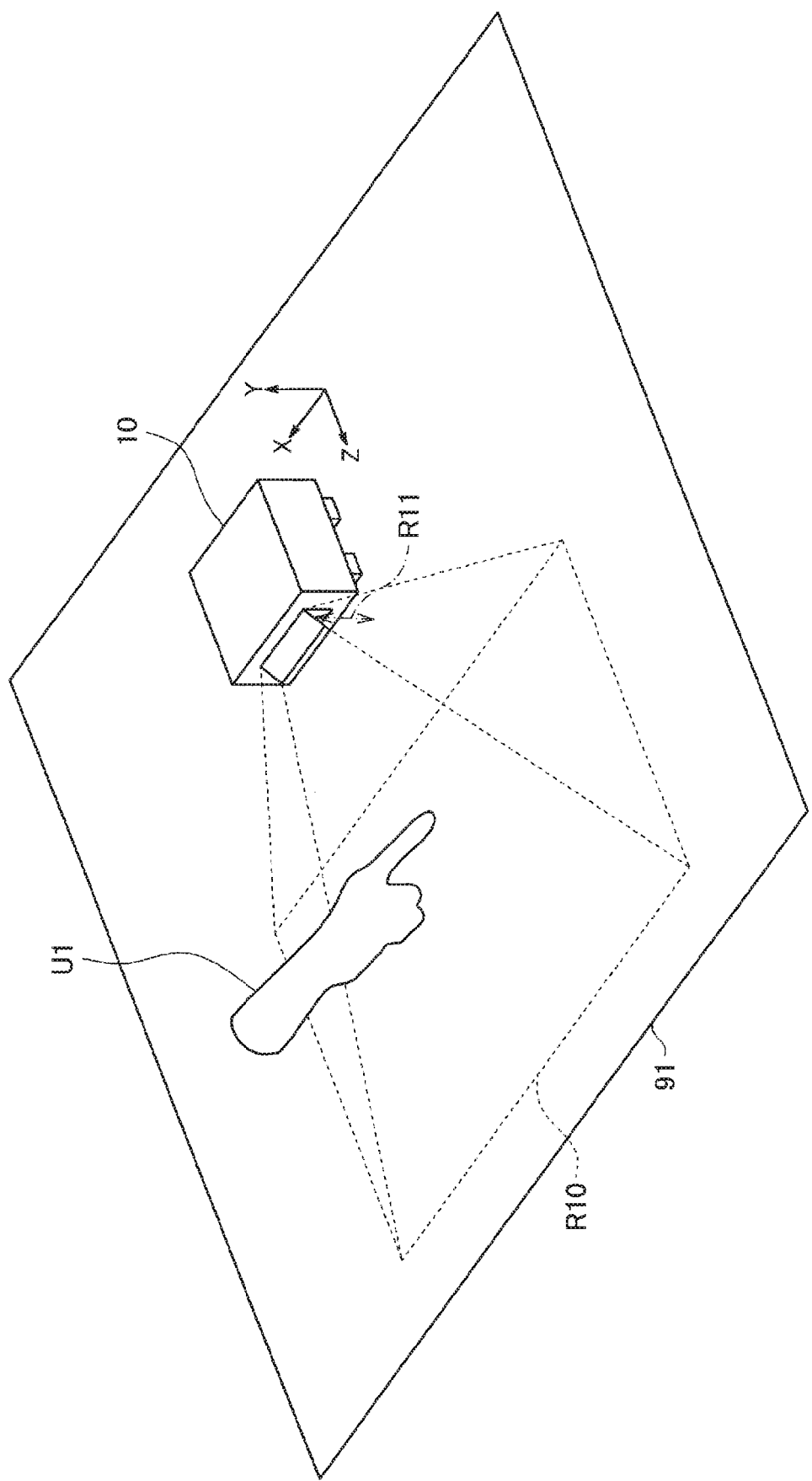
FIG. 18 is an explanatory diagram for explaining an example of a schematic configuration of an information processing apparatus according to Modification 2.

5.2. Modification 2: Example of Mode in Case of Detecting User Operations with Respect to Projection Plane Next, an example of the information processing apparatus 10 according to Modification 2 will be described with reference to FIGS. 17 and 18. FIGS. 17 and 18 are explanatory diagrams for explaining an example of a schematic configuration of the information processing apparatus 10 according to Modification 2. Modification 2 describes an example of control in a case in which, in addition to the function of projecting a video onto a projection plane, a function for detecting user operations such as touches performed on the projected video, like what is called a touch panel, is added to the information processing apparatus 10 according to the present embodiment.

For example, FIG. 17 illustrates an example of a case in which the information processing apparatus 10 presents display information to a user by treating a wall surface extending in an approximately vertical direction as the projection plane 90, and projecting the display information in an approximately horizontal direction onto the projection plane 90, as illustrated in FIG. 1. In the example illustrated in FIG. 17, the user is performing what are called touch operations (operations such as tapping, dragging, and pinching, for example) with an operating body U1 such as a hand, with respect to display information projected onto the projection region R10 in the projection plane 90.

By sensing within the projection region R10 with infrared or the like, for example, the information processing apparatus 10 is able to recognize the position of the operating body U1 in the projection region R10. With this arrangement, by comparing the recognized position of the operating body U1 in the projection region R10 with the position in the projection region R10 of display information to be projected, the information processing apparatus 10 is able to specify display information indicated by the operating body U1.

Also, as another example, by imaging the projection region R10 with an imaging unit such as a camera, and comparing the captured image of the projection region R10 with an image to be projected onto the projection region R10 (that is, an image that includes display information), the information processing apparatus 10 may detect the position and orientation of the operating body U1 in the projection region R10. In this case, in the case in which the operating body U1 exists within the projection region R10, by comparing the captured image of the projection region R10 with the image to be projected onto the projection region R10, and extracting the operating body U1 as the difference, the information processing apparatus 10 detects the position and orientation of the operating body U1 within the projection region R10. Additionally, by using what is called a stereo camera or the like as the imaging unit, the information processing apparatus 10 may specify the position of the operating body U1 in the depth direction.

By utilizing mechanisms as described above, the information processing apparatus 10 becomes able to detect a user operation such as a touch with respect to a projected image, and specify the target of the user operation from among display information projected onto the projection plane 90, like what is called a touch panel.

Note that touch operations as described above are also applicable to the case in which the information processing apparatus 10 projects a video onto a plane such as a tabletop as the projection plane 91, as described with reference to FIG. 16. For example, FIG. 18 illustrates an example of a case in which the information processing apparatus 10 presents display information to a user by treating a wall surface extending in an approximately horizontal direction as the projection plane 91, and projecting the display information in an approximately vertical direction onto the projection plane 91, as illustrated in FIG. 16. Even in the example illustrated in FIG. 18, by utilizing a mechanism similar to the example illustrated in FIG. 17, the information processing apparatus 10 is able to detect a user operation such as a touch with respect to a projected image, and specify the target of the user operation from among display information projected onto the projection plane 91, like what is called a touch panel.

On the other hand, under conditions like those illustrated in FIGS. 17 and 18, the operating body U1 becomes interposed between the information processing apparatus 10 (more specifically, the projection unit 11) and the projection plane. For this reason, conditions may be anticipated in which the operating body U1 is interposed inside the measurement range of the distance R11 between the projection unit 11 and the projection plane (that is, inside the detection range of the projection plane) by the information processing apparatus 10 (more specifically, the distance measuring unit 13). Under such conditions, in the case of measuring the distance between the projection unit 11 and the operating body U1 positioned in front of the projection plane, for example, in some cases the information processing apparatus 10 may have difficulty distinguishing a measurement result regarding the distance and a measurement result regarding the distance R11 between the projection unit 11 and the projection plane. In other words, in the case in which a touch operation is performed by the operating body U1, cases are anticipated in which the information processing apparatus 10 incorrectly recognizes that the distance R11 between the projection unit 11 and the projection plane has changed.

For this reason, the information processing apparatus 10 according to Modification 2 combines a measurement result regarding the distance R11 between the projection unit 11 and the projection plane, and a detection result regarding acceleration imparted to the information processing apparatus 10, and thereby distinguishes between a change in the distance R11 due to a touch operation, and a change in the distance R11 due to movement of the information processing apparatus 10. Additionally, the information processing apparatus 10 may detect a change in the orientation (a change in the attitude) of itself with an angular velocity sensor or the like, and utilize the detection result to distinguish between a change in the distance R11 due to a touch operation and a change in the distance R11 due to movement of the information processing apparatus 10.

More specifically, in the case in which the measurement result regarding the distance R11 changes due to a touch operation by the operating body U1, it may be assumed that the information processing apparatus 10 itself is not moving (that is, is in the still state). For this reason, in the case in which the measurement result regarding the distance R11 has changed, if the there is no change in detected acceleration, or if the change in detected acceleration is extremely small, the information processing apparatus 10 may recognize that the change in the distance R11 is due to a touch operation by the operating body U1.

In contrast, under conditions such as when the user is adjusting the display mode of the video (for example, the projection position and projection size of the video), conditions may be anticipated in which the measurement result regarding the distance R11 changes in relation to changes in the position and orientation of the information processing apparatus 10. For this reason, in the case in which, in addition to a change in the measurement result regarding the distance R11, at least one of an acceleration imparted to the information processing apparatus 10 and a change in the orientation of the information processing apparatus 10 is detected, the information processing apparatus 10 may recognize that the position and orientation of itself has been adjusted by the user. Note that in the case in which the acceleration imparted to itself is greater than a threshold value, the information processing apparatus 10 may recognize that the user is picking up itself to move the information processing apparatus 10.

The above references FIGS. 17 and 18 to describe, as an example of the information processing apparatus 10 according to Modification 2, an example of control in a case of adding a function for detecting a user operation such as a touch with respect to the projected video, like what is called a touch panel.

5.3. Modification 3: Example of Control for Reducing Power Consumption

Next, an example of control for further reducing power consumption in the information processing apparatus 10 according to the present embodiment will be described as Modification 3. As described above, the information processing apparatus 10 according to the present embodiment successively detects changes in the distance R11 between the projection unit 11 and the projection plane, and accelerations imparted to itself, to thereby detect changes in the state of itself. In contrast, by limiting part of the operations related to the detection of changes in the state of itself, the information processing apparatus 10 according to Modification 3 reduces the consumption of power in relation to the detection of changes in state.

For example, the information processing apparatus 10 according to Modification 3 may be configured to be able to change a sampling rate associated with the measurement of the distance R11 between the projection unit 11 and the projection plane. More specifically, the information processing apparatus 10 is configured to be able to selectively switch between a low sampling rate mode in which power consumption is reduced by dropping the sampling rate, and a high sampling rate mode in which the resolution is improved by raising the sampling rate. Note that during operation in the low sampling rate mode, the information processing apparatus 10 may also control the measurement range of the distance R11 to be longer. Also, during operation in the high sampling rate mode, to further improve the resolution associated with the measurement of the distance R11, the information processing apparatus 10 may control the measurement range of the distance R11 to be shorter than during operation in the low sampling rate mode.

Additionally, under conditions in which the distance R11 between the projection unit 11 and the projection plane is stable, such as during the projection of a video, the information processing apparatus 10 may reduce power consumption by operating in the low sampling rate mode. On the other hand, in the case of detecting a change in the distance R11 between the projection unit 11 and the projection plane, the information processing apparatus 10 may switch to operation in the high sampling rate mode, and thereby measure the distance R11 with high resolution. By measuring the distance R11 with high resolution in this way, the information processing apparatus 10 becomes able to further improve the precision of control of the focal position (for example, AF control) of the video projected from the projection lens 117, for example.

Additionally, the information processing apparatus 10 according to Modification 3 may also control operations associated with the measurement of the distance R11 between the projection unit 11 and the projection plane on the basis of a detection result regarding acceleration imparted to itself. More specifically, in the case of recognizing, on the basis of a detection result regarding acceleration, conditions in which the position and orientation of itself are changing greatly, such as in the case in which itself is being picked up, the information processing apparatus 10 may curb power consumption by temporarily stopping operations associated with the measurement of the distance R11.

In addition, the information processing apparatus 10 according to Modification 3 may also be configured to be able to change the sampling rate associated with the detection of acceleration imparted to itself. For example, by dropping the sampling rate associated with the detection of acceleration, it becomes possible to reduce the consumption of power in relation to the detection of acceleration. On the other hand, by raising the sampling rate associated with the detection of acceleration, it becomes possible to detect the acceleration with higher resolution.

Given such a configuration, the information processing apparatus 10 may also control operations associated with the detection of acceleration imparted to itself on the basis of a measurement result regarding the distance R11 between the projection unit 11 and the projection plane. More specifically, in the case in which there is no change (or little change) in the measurement result regarding the distance R11, the information processing apparatus 10 may curb power consumption by dropping the sampling rate associated with the detection of acceleration.

In addition, cases may also be anticipated in which multiple detection devices are provided in order to detect various states of the information processing apparatus 10. In such cases, the information processing apparatus 10 may also weight each detection device from the perspective of detection precision and power consumption, and prioritize the operation of detection devices with higher detection precision and detection devices with lower power consumption, in accordance with the state of itself. Also, by having detection results from each of multiple detection devices complement each other, the information processing apparatus 10 may improve the precision associated with the detection of the state of itself, and also reduce the consumption of power associated with the detection.

The above describes, as Modification 3, an example of control for further reducing power consumption in the information processing apparatus 10 according to the present embodiment.

5.4. Modification 4: Example of Control Depending on Operating Environment

Next, an example of the information processing apparatus 10 according to Modification 4 will be described. As described above, the information processing apparatus 10 according to the present embodiment determines the state (for example, the still state or not) of itself on the basis of a detection result regarding acceleration imparted to itself and a detection result regarding angular velocity, and controls the operation of the projection unit 11 on the basis of the determination result. On the other hand, under conditions in which the information processing apparatus 10 is used inside a vehicle such as a train or an automobile, for example, even if the information processing apparatus 10 is in a state of being still relative to the vehicle, conditions may be anticipated in which the information processing apparatus 10 vibrates in relation to the movement and vibration of the vehicle. Accordingly, Modification 4 describes an example of operations in the case in which the information processing apparatus 10 switches control associated with the determination of the state of itself in accordance with the environment in which itself operates (in other words, the usage environment).

More specifically, under conditions of operating inside a vehicle such as a train or an automobile, a case may be anticipated in which the information processing apparatus 10 detects an acceleration that changes comparatively gently in relation to the acceleration or deceleration of the vehicle, or when going around a curve. Also, under conditions of operating inside a vehicle, a case may be anticipated in which the information processing apparatus 10 detects an acceleration that changes comparatively sharply, because of the vehicle vibrating due to unevenness in the road or the like. Under such conditions, for example, the information processing apparatus 10 may use a filter or the like to extract the component of acceleration that changes comparatively gently over time from a detection result regarding the acceleration imparted to itself, and on the basis of the extraction result, automatically recognize that itself is operating inside a moving vehicle. Additionally, in the case of recognizing that itself is operating inside a moving vehicle, the information processing apparatus 10 may also switch to an operating mode for executing control appropriate for operation inside a vehicle (hereinafter called the "in-vehicle mode" in some cases).

When operating in the in-vehicle mode, for example, the information processing apparatus 10 may extract a component of acceleration that changes comparatively suddenly in a short time from a detection result regarding the acceleration imparted to itself, recognize the extraction result as an acceleration imparted to itself, and determine the state (for example, the still state or not) of itself. Additionally, the information processing apparatus 10 may account for the acceleration imparted to itself by the vibration of the vehicle, and apply different threshold values from a normal mode (for example, a mode of being used indoors or the like) with respect to the determination of the acceleration and the angular velocity. As a more specific example, when operating in the in-vehicle mode, the information processing apparatus 10 may switch the threshold values to use in the determination of the acceleration and the angular velocity so that the dead zone becomes wider compared to the normal mode.

Note that the example described above is merely one example, and insofar as the control associated with the determination of the state of the information processing apparatus 10 is switched in accordance with the environment where the information processing apparatus 10 is used (that is, the operating environment of the information processing apparatus 10), the target environment and the content of the control appropriate to the environment are not necessarily limited to the example described above. Also, the above describes an example of a case in which the information processing apparatus 10 itself recognizes the state of itself, and switches the operating mode (for example, switches to the in-vehicle mode) in accordance with the recognition result, but the configuration is not necessarily limited to the example indicated above. As a specific example, the information processing apparatus 10 may also receive a user operation to switch the operating mode.

The above describes, as an example of the information processing apparatus 10 according to Modification 4, an example of control associated with the determination of the state (for example, the still state or not) of the information processing apparatus 10 depending on the operating environment of the information processing apparatus 10.

5.5. Modification 5: Example of Operation in Case of Controlling Multiple Projection Units Next, as an example of the information processing apparatus 10 according to Modification 5, an example of control in the case in which multiple projection units 11 are provided will be described. For example, a usage scenario may be anticipated in which, by joining or overlapping videos respectively projected from multiple projectors, a single video is formed. More specifically, by overlapping videos projected from multiple projectors, it becomes possible to project a higher-resolution video or a higher-definition video. Also, by joining videos projected from multiple projectors, it becomes possible to realize the projection of a video of larger size that would be difficult to realize with a single projector. Modification 5 anticipates conditions like the above, and describes an example of control in a case in which the information processing apparatus 10 determines the state of itself or the state of each of multiple projection units 11, and in accordance with the result of the determination, controls the operation of each of the multiple projection units 11.

As a specific example, a case may be anticipated in which the information processing apparatus 10 (control unit 16) and the multiple projection units 11 are configured as different apparatus from each other. In such a case, for each of the multiple projection units 11, the information processing apparatus 10 may acquire a detection result regarding the acceleration imparted to the projection unit 11, and a measurement result regarding the distance R11 between the projection unit 11 and the projection plane, for example. Additionally, for example, on the basis of the detection result regarding the acceleration and the measurement result regarding the distance R11 for each projection unit 11, the information processing apparatus 10 may determine the state (that is, the still state or not) of the projection unit 11, and individually execute control of the operation of the projection unit 11 (such as control of the amount of illuminating light L1 and control of the focal position, for example) in accordance with the determination result.

Also, as another example, the information processing apparatus 10 (control unit 16) and the multiple projection units 11 may be configured in an integrated manner. In such a case, the information processing apparatus 10 may individually execute control of the operation of each of the multiple projection units 11 (such as control of the amount of illuminating light L1 and control of the focal position, for example) in accordance with a determination result regarding the state of itself, for example.

As a specific example, in the case of detecting a change in the position and orientation of itself, the information processing apparatus 10 may limit the amount of illuminating light L1 emitted from the illumination unit 111 of each of only a subset of the multiple projection units 11. More specifically, the information processing apparatus 10 may anticipate the projection region R10 under conditions of orientation straight towards the projection plane, and limit the amount of illuminating light L1 emitted from the illumination unit 111 only for a projection unit 11 whose video is predicted to be projected outside of the projection region R10 in relation to the change in position and orientation.

Also, as another example, in the case of detecting a change in the position and orientation of itself, the information processing apparatus 10 may control the focal position of the video projected from the projection lens 117 of only a subset of the multiple projection units 11. More specifically, the information processing apparatus 10 may control the focal position of the video projected from the projection lens 117 of only a projection unit 11 for which the change in the distance R11 to the projection plane has exceeded a threshold value in relation to the change in the position and orientation of itself.

Obviously, the example described above is merely one example, and the mode is not particularly limited insofar as the information processing apparatus 10 is able to control the operation of each projection unit 11 in accordance with the state of itself and a determination result regarding the state of each projection unit 11.

The above describes, as an example of the information processing apparatus 10 according to Modification 5, an example of control in the case in which multiple projection units 11 are provided.

6. HARDWARE CONFIGURATION

Next, a hardware configuration of the image processing apparatus 10 according to an embodiment of the present disclosure will be described with reference to FIG. 19. FIG. 19 is a block diagram illustrating an exemplary hardware configuration of the information processing apparatus 10 according to an embodiment of the present disclosure.

As illustrated in FIG. 19, the information processing apparatus 10 includes a central processing unit (CPU) 901, a read only memory (ROM) 903, and a random access memory (RAM) 905. In addition, the information processing apparatus 10 may include a host bus 907, a bridge 909, an external bus 911, an interface 913, an input apparatus 915, an output apparatus 917, a storage apparatus 919, a drive 921, a connection port 923, and a communication apparatus 925. Further, the information processing apparatus 10 may include an imaging apparatus 933 and a sensor 935 as necessary. The information processing apparatus 10 may include a processing circuit such as a digital signal processor (DSP) or an application specific integrated circuit (ASIC) instead of or in addition to the CPU 901.

The CPU 901 serves as a computational processing apparatus and a control apparatus, and controls all of or a part of the operations in the information processing apparatus 10 in accordance with various programs recorded in the ROM 903, the RAM 905, the storage apparatus 919 or a removable recording medium 927. The ROM 903 stores programs, operation parameters, and the like used by the CPU 901. The RAM 905 temporarily stores program used in the execution of the CPU 901, parameters that changes as appropriate in the execution, and the like. The CPU 901, ROM 903, and RAM 905 are connected to each other by the host bus 907 including an internal bus such as a CPU bus. In addition, the host bus 907 is connected to the external bus 911 such as a peripheral component interconnect/interface (PCI) bus via the bridge 909. For example, the control unit 16 described above may be realized by the CPU 901.

The input apparatus 915 is, for example, an apparatus operated by a user with a mouse, a keyboard, a touch panel, buttons, switches, a lever, and the like. The input apparatus 915 may include a mic that detects a sound of a user. The input apparatus 915 may be, for example, a remote control unit using infrared light or other radio waves, or may be an external connection apparatus 929 such as a portable phone operable in response to the operation of the information processing apparatus 10. The input apparatus 915 includes an input control circuit that generates an input signal on the basis of the information input by a user and outputs the input signal to the CPU 901. By operating the input apparatus 915, a user can input various types of data to the information processing apparatus 10 or issue instructions for causing the information processing apparatus 10 to perform a processing operation. In addition, the imaging apparatus 933 to be described below can function as an input apparatus by imaging a motion or the like of a hand of the user.

The output apparatus 917 includes an apparatus capable of visually or audibly notifying a user of the acquired information. The output apparatus 917 may be, for example, a display apparatus such as a liquid crystal display (LCD), a plasma display panel (PDP), an organic electro-luminescence (EL) display, and a projector, a hologram display apparatus, an audio output apparatus, such as a speaker or a headphone, a printer, and the like. The output apparatus 917 outputs the results obtained from the process of the information processing apparatus 10 in the form of video such as text or an image and audio such as voice or sound. In addition, the output apparatus 917 may include a light or the like to brighten the surroundings. For example, the projection unit 11 described above may be realized by the output apparatus 917.

The storage apparatus 919 is an apparatus for data storage configured as an example of a storage unit of the information processing device 10. The storage apparatus 919 includes, for example, a magnetic storage device such as a hard disk drive (HDD), a semiconductor storage device, an optical storage device, a magneto-optical storage device, or the like. The storage apparatus 919 stores programs to be executed by the CPU 901, various data, various data obtained from the outside, and the like.

The drive 921 is a reader/writer for the removable recording medium 927 such as a magnetic disk, an optical disk, a magneto-optical disk, or a semiconductor memory, and is embedded in the information processing apparatus 10 or externally attached thereto. The drive 921 reads information recorded in the attached removable recording medium 927 and outputs the information to the RAM 905. Further, the drive 921 writes record in the attached removable recording medium 927.

The connection port 923 is a port used to directly connect apparatuses to the information processing apparatus 10. The connection port 923 may be, for example, a universal serial bus (USB) port, an IEEE1394 port, a small computer system interface (SCSI) port, or the like. In addition, the connection port 923 may be an RS-232C port, an optical audio terminal, High-Definition Multimedia Interface (HDMI) (registered trademark) port, or the like. By connecting the external connection apparatus 929 to the connection port 923, various data may be exchanged between the information processing device 10 and the external connection apparatus 929. For example, the video input unit 15 described above may be realized by the connection port 923.

The communication apparatus 925 is, for example, a communication interface including a communication device or the like for connection to a communication network 931. The communication apparatus 925 may be, for example, a communication card for a wired or wireless local area network (LAN), Bluetooth (registered trademark), wireless USB (WUSB), or the like. In addition, the communication apparatus 925 may be a router for optical communication, a router for asymmetric digital subscriber line (ADSL), a modem for various kinds of communications, or the like. The communication apparatus 925 transmits and receives signals to and from, for example, the Internet or another communication apparatus using a predetermined protocol such as TCP/IP. In addition, the communication network 931 to be connected to the communication apparatus 925 is a network connected in a wired or wireless manner, and is, for example, the Internet, a home LAN, infrared communication, radio wave communication, satellite communication, or the like. For example, the communication unit 14 described above may be realized by the connection port 923.

The imaging apparatus 933 is an apparatus that generates an image by imaging a real space using an image sensor such as a charge-coupled device (CCD) or a complementary metal oxide semiconductor (CMOS), as well as various members such as one or more lenses for controlling the formation of a subject image on the image sensor, for example. The imaging apparatus 933 may be an apparatus that captures still images and may also be an apparatus that captures moving images. For example, the distance measuring unit 13 described above may be realized by the imaging apparatus 933.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 10, such as the attitude of the case of the information processing apparatus 10, as well as information regarding the environment surrounding the information processing apparatus 10, such as brightness or noise surrounding the information processing apparatus 10, for example. The sensor 935 may also include a global positioning system (GPS) sensor that receives GPS signals and measures the latitude, longitude, and altitude of the apparatus. For example, the detection unit 12 described above may be realized by the sensor 935. Additionally, the distance measuring unit 13 described above may also be realized by the sensor 935.

The foregoing thus illustrates an exemplary hardware configuration of the information processing apparatus 10. Each of the above components may be realized with general-purpose members or hardware specialized in the function of each component. Such a configuration may also be modified as appropriate in accordance with the technological level at the time of the implementation.

7. CONCLUSION

Thus, as described above, the information processing apparatus 10 according to the present embodiment controls the operations of the projection unit 11 (for example, the amount of illuminating light L1 and the focal position) on the basis of a detection result regarding the position and orientation of itself (or the projection unit 11) and a detection result regarding the spatial positional relationship between the projection unit 11 and the projection plane. As a more specific example, under conditions in which the position and orientation of itself change more greatly, the information processing apparatus 10 recognizes conditions in which itself is being carried to move itself, and limits the amount of illuminating light L1 from the illumination unit 111. On the other hand, in the case in which the change in the distance R11 between the projection unit 11 and the projection plane is small, if the change in the position and orientation of itself is less than a threshold value, the information processing apparatus 10 recognizes conditions in which the user is adjusting the position and orientation of itself to thereby adjust the display mode, such as the position and size at which the video is projected. In this case, the information processing apparatus 10 maintains the turned-on state of the illumination unit 111, or restrains the amount of illuminating light L1 in a range in which the video projected onto the projection plane can be distinguished. According to a configuration like the above, the information processing apparatus 10 according to the present embodiment is able to control the operations of the projection unit 11 in a more favorable mode depending on the usage conditions, and by extension, further improve convenience.

The preferred embodiment(s) of the present disclosure has/have been described above with reference to the accompanying drawings, whilst the present disclosure is not limited to the above examples. A person skilled in the art may find various alterations and modifications within the scope of the appended s, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an acquisition unit configured to acquire a first detection result indicating information regarding at least one of a position and an orientation of a projection unit that causes display information to be display by projecting the display information onto a projection plane, and a second detection result indicating a spatial positional relationship between the projection unit and the projection plane; and a control unit configured to control an operation of the projection unit on a basis of the first detection result and the second detection result.

(2)

The information processing apparatus according to (1), in which the acquisition unit acquires, as the first detection result, a detection result regarding a change in at least one of the position and the orientation of the projection unit.

(3)

The information processing apparatus according to (1) or (2), in which the acquisition unit acquires, as the second detection result, a detection result regarding a distance between the projection unit and the projection plane.

(4)

The information processing apparatus according to any one of (1) to (3), in which the control unit
acquires, as the first detection result, a detection result regarding an acceleration of the projection unit, and
controls, on a basis of the detection result regarding the acceleration and the second detection result, an amount of light of a light source for the projection unit to project the display information.

(5)

The information processing apparatus according to (4), in which in a case in which the detection result regarding the acceleration is equal to or greater than a first threshold value but less than a second threshold value, the control unit controls the amount of light of the light source that is on, in accordance with whether or not an amount of change in the spatial positional relationship is equal to or greater than a third threshold value.

(6)

The information processing apparatus according to (5), in which in a case in which the detection result regarding the acceleration is equal to or greater than the first threshold value but less than the second threshold value, and the amount of change in the spatial positional relationship is equal to or greater than the third threshold value, the control unit restrains the amount of light of the light source that is on.

(7)

The information processing apparatus according to (6), in which in a case in which the detection result regarding the acceleration is equal to or greater than the first threshold value but less than the second threshold value, and the amount of change in the spatial positional relationship is less than the third threshold value, the control unit maintains a turned-on state of the light source.

(8)

The information processing apparatus according to (6), in which in a case in which the detection result regarding the acceleration is equal to or greater than the first threshold value but less than the second threshold value, and the amount of change in the spatial positional relationship is less than the third threshold value, the control unit restrains the amount of light of the light source that is on, such that an amount of restraint is smaller than a case in which the amount of change in the spatial positional relationship is equal to or greater than the third threshold value.

(9)

The information processing apparatus according to any one of (5) to (8), in which in a case in which the detection result regarding the acceleration is less than the first threshold value, the control unit maintains a turned-on state of the light source.

(10)

The information processing apparatus according to (5), in which the control unit controls the amount of light of the light source in accordance with the detection result of the acceleration pointing in a predetermined direction.

(11)

The information processing apparatus according to (10), in which in a case in which the acceleration pointing in a vertical direction is equal to or greater than a threshold value, the control unit restrains the amount of light of the light source that is on.

(12)

The information processing apparatus according to (5), in which in a case in which the amount of change in the orientation with respect to a predetermined standard is equal to or greater than a threshold value, the control unit restrains the amount of light of the light source that is on.

(13)

The information processing apparatus according to (5), in which in a case in which the amount of change in the orientation per unit time is less than a threshold value, the control unit maintains a turned-on state of the light source.

(14)

The information processing apparatus according to any one of (1) to (13), in which the control unit controls, on a basis of the detection result regarding the spatial positional relationship, a focal position for the projection unit to project the display information onto the projection plane.

(15)

The information processing apparatus according to (14), in which in a case in which a state of the amount of change in the spatial positional relationship being less than a threshold value continues for a predetermined period or more, the control unit controls the focal position.

(16)

An information processing method including:

acquiring a first detection result indicating information regarding at least one of a position and an orientation of a projection unit that causes display information to be display by projecting the display information onto a projection plane, and a second detection result indicating a spatial positional relationship between the projection unit and the projection plane; and controlling, by a processor, an operation of the projection unit on a basis of the first detection result and the second detection result.

(17)

A program causing a computer to execute:

acquiring a first detection result indicating information regarding at least one of a position and an orientation of a projection unit that causes display information to be display by projecting the display information onto a projection plane, and a second detection result indicating a spatial positional relationship between the projection unit and the projection plane; and controlling an operation of the projection unit on a basis of the first detection result and the second detection result.

REFERENCE SIGNS LIST 10 information processing apparatus
11 projection unit
111 illumination unit
113 polarization separation element
115 light bulb
117 projection lens
12 detection unit
13 distance measuring unit
14 communication unit
15 video input unit
15 polarization separation element
16 control unit
161 output control unit
163 determination unit
165 amount-of-light control unit
167 focus control unit

The invention claimed is:

1. An information processing apparatus, comprising:
a projection unit that includes a light source configured to project display information onto a projection plane;
a determination unit configured to acquire a first detection result indicating information regarding at least one of a position of the projection unit or an orientation of the projection unit, and a second detection result indicating a spatial positional relationship between the projection unit and the projection plane,
wherein the first detection result further includes information regarding an acceleration of the projection unit; and a control unit configured to control an amount of light of the light source of the projection unit based on the first detection result and the second detection result.

2. The information processing apparatus according to claim 1, wherein
the determination unit is further configured to acquire, as the first detection result, a detection result regarding a change in at least one of the position of the projection unit and the orientation of the projection unit.

3. The information processing apparatus according to claim 1, wherein
the determination unit is further configured to acquire, as the second detection result, a detection result regarding a distance between the projection unit and the projection plane.

4. The information processing apparatus according to claim 1, wherein
in a case in which the first detection result regarding the acceleration is one of equal to or greater than a first threshold value but less than a second threshold value, the control unit is further configured to control the amount of the light of the light source, based on whether an amount of change in the spatial positional relationship is one of equal to or greater than a third threshold value.

5. The information processing apparatus according to claim 4, wherein
in a case in which the first detection result regarding the acceleration is one of equal to or greater than the first threshold value but less than the second threshold value, and the amount of change in the spatial positional relationship is one of equal to or greater than the third threshold value, the control unit is further configured to restrain the amount of the light of the light source.

6. The information processing apparatus according to claim 5, wherein
in a case in which the first detection result regarding the acceleration is equal to or greater than the first threshold value but less than the second threshold value, and the amount of change in the spatial positional relationship is less than the third threshold value, the control unit is further configured to maintain a turned-on state of the light source.

7. The information processing apparatus according to claim 5, wherein
in a case in which the first detection result regarding the acceleration is one of equal to or greater than the first threshold value but less than the second threshold value, and the amount of change in the spatial positional relationship is less than the third threshold value, the control unit is further configured to restrain the amount of the light of the light source, such that the restrained amount is smaller than a case in which the amount of change in the spatial positional relationship is one of equal to or greater than the third threshold value.

8. The information processing apparatus according to claim 4, wherein
in a case in which the first detection result regarding the acceleration is less than the first threshold value, the control unit is further configured to maintain a turned-on state of the light source.

9. The information processing apparatus according to claim 4, wherein
the control unit is further configured to control the amount of the light of the light source based on the first detection result of the acceleration pointing in a specific direction.

10. The information processing apparatus according to claim 9, wherein
in a case in which the acceleration pointing in a vertical direction is equal to or greater than a threshold value, the control unit is further configured to restrain the amount of the light of the light source.

11. The information processing apparatus according to claim 4, wherein
in a case in which an amount of change in the orientation with respect to a specific standard is equal to or greater than a threshold value, the control unit is further configured to restrain the amount of the light of the light source.

12. The information processing apparatus according to claim 4, wherein
in a case in which an amount of change in the orientation per unit time is less than a threshold value, the control unit is further configured to maintain a turned-on state of the light source.

13. The information processing apparatus according to claim 1, wherein
the control unit is further configured to control, based on the second detection result regarding the spatial positional relationship, a focal position for the projection unit to project the display information onto the projection plane.

14. The information processing apparatus according to claim 13, wherein
in a case in which a state of an amount of change in the spatial positional relationship is less than a threshold value for a specific period or more, the control unit is further configured to control the focal position.

15. An information processing method, comprising:
in an information processing apparatus that includes a projection unit, a determination unit, and a processor:
projecting, by the projection unit, display information onto a projection plane;
acquiring, by the determination unit, a first detection result indicating information regarding at least one of a position of the projection or an orientation of the projection unit, and a second detection result indicating a spatial positional relationship between the projection unit and the projection plane,
wherein the first detection result further includes information regarding an acceleration of the projection unit; and
controlling, by the processor, an amount of light of a light source of the projection unit based on the first detection result and the second detection result.

16. A non-transitory computer-readable medium having stored thereon, computer-executable instructions that, when executed by a computer, cause the computer to execute operations, the operations comprising:
projecting display information onto a projection plane;
acquiring a first detection result indicating information regarding at least one of a position of a projection unit or an orientation of the projection unit, and a second detection result indicating a spatial positional relationship between the projection unit and the projection plane,
wherein the first detection result further includes information regarding an acceleration of the projection unit; and controlling an amount of light of a light source of the projection unit based on the first detection result and the second detection result.

* * * * *